US012005442B2

(12) United States Patent
Sharma et al.

(10) Patent No.: US 12,005,442 B2
(45) Date of Patent: Jun. 11, 2024

(54) SYSTEMS AND ASSEMBLIES FOR POINT-OF-CARE FLUIDIC ASSAYS

(71) Applicant: Consure Medical, Inc., San Francisco, CA (US)

(72) Inventors: Amit Kumar Sharma, New Delhi (IN); Nishith Chasmawala, Surat (IN); Durga SaiSri Ambati, Visakhapatnam (IN); Pragya Singh, Allahabad (IN); John Everett Martin, Uttar Pradesh (IN)

(73) Assignee: CM Technologies, Inc., Lewisville, TX (US)

( * ) Notice: Subject to any disclaimer, the term of this patent is extended or adjusted under 35 U.S.C. 154(b) by 391 days.

(21) Appl. No.: 16/917,877

(22) Filed: Jun. 30, 2020

(65) Prior Publication Data

US 2021/0039095 A1 Feb. 11, 2021

(30) Foreign Application Priority Data

Jul. 1, 2019 (IN) ............................ 201911026299

(51) Int. Cl.
*B01L 3/00* (2006.01)

(52) U.S. Cl.
CPC ..... *B01L 3/502715* (2013.01); *B01L 3/50273* (2013.01); *B01L 2200/026* (2013.01);
(Continued)

(58) Field of Classification Search
CPC ........... B01L 3/502715; B01L 3/50273; B01L 2200/026; B01L 2200/10; B01L 2300/047;
(Continued)

(56) References Cited

U.S. PATENT DOCUMENTS 5,454,268 A * 10/1995 Kim ...................... B01L 3/0231
422/927
2002/0085958 A1* 7/2002 Nemcek ............ B01L 3/502715
422/400

(Continued)

OTHER PUBLICATIONS

J. H. Boone, et al., Elevated lactoferrin is associated with moderate to severe Clostridium difficile disease, stool toxin, and 027 infection, Eur J Clin Microbiol Infect Dis (2013) 32:1517-1523.

(Continued)

*Primary Examiner* — Samuel P Siefke
*Assistant Examiner* — Henry H Nguyen

(57) ABSTRACT

Systems and assemblies for performing point-of-care, fluidic assays having self-contained, portable fluidic assay systems or assemblies. A housing comprises an assaying assembly, an inspiration actuator, and an expulsion actuator. The inspiration and expulsion actuators may include one-way valves. The assaying assembly is configured to provide a visual indicator in response to being contacted by one or more target analytes within a fluid-assay sample mixture. The fluidic assay assembly has a reciprocal plunger disposed therewithin and, in some embodiments, the plunger has a resilient member to bias the plunger in one direction. Movement of the plunger in a first direction implements an inspiration stroke for drawing the assay sample such that it contacts the fluid from the fluid chamber and continued movement of the plunger implements an expulsion stroke for expelling the fluid-assay sample mixture through the outlet opening to the receptacle of the assaying assembly.

11 Claims, 20 Drawing Sheets

(52) U.S. Cl.
CPC ..... *B01L 2200/10* (2013.01); *B01L 2300/047* (2013.01); *B01L 2300/0825* (2013.01); *B01L 2300/0832* (2013.01); *B01L 2300/0861* (2013.01); *B01L 2400/0406* (2013.01); *B01L 2400/0478* (2013.01); *B01L 2400/0605* (2013.01)

(58) Field of Classification Search
CPC ..... B01L 2300/0825; B01L 2300/0832; B01L 2300/0861; B01L 2400/0406; B01L 2400/0478; B01L 2400/0605
See application file for complete search history.

(56) References Cited

U.S. PATENT DOCUMENTS

| | | | | |
|---|---|---|---|---|
| 2003/0186218 A1* | 10/2003 | Singh | B01L 3/5027 | |
| | | | 435/5 | |
| 2006/0178644 A1* | 8/2006 | Reynolds | A61J 1/2093 | |
| | | | 604/232 | |
| 2017/0274376 A1* | 9/2017 | Nobile | G01N 1/4077 | |

OTHER PUBLICATIONS

Bincy P. Abraham, MD, MS, Sunanda Kane, MD, MSPH, Fecal Markers: Calprotectin and Lactoferrin, Gastroenterol Clin N Am 41 (2012) 483-495.
Alfa et al., Fecal specimens for Clostridium difficile Diagnostic Testing are Stable for up to 72 hours at 4° C , J Med Microb Diagn 2014, 3:2.
Emanuel Burri and Christoph Beglinger, The use of fecal calprotectin as a biomarker ingastrointestinal disease, Expert Rev. Gastroenterol Hepatol 8(2), 197-210 (2014).
Summers AM, Snow KG, Dunham LM and Craft DW, Comparative Evaluation of Six Commercially Available Assays for the Detection of Clostridium difficile Toxins in Fecal Specimens.
Gregoris R, Huynh A, Machon C, Sheikh F, Bilimoria K, Lee Y, The standard: diagnostic timeline, methods, and costs for c. difficile, International Genetically Engineered Machine Team, McMaster University.
Kimberle C. Chapin, Roberta A. Dickenson, Fongman Wu, and Sarah B. Andrea, Comparison of Five Assays for Detection of Clostridium difficile Toxin, Comparison of Five Assays for Detection of Clostridium difficile Toxin, The Journal of Molecular Diagnostics, vol. 13, No. 4, Jul. 2011.
Michel Delme'e, Johan Van Broeck, Anne Simon, Miche'Le Janssens and Veronique Avesani, Laboratory diagnosis of Clostridium difficile associated diarrhoea: a plea for culture, Journal of Medical Microbiology (2005), 54, 187-191.
Kerrie Eastwood, Patrick Else, Andre' Charlett, and Mark Wilcox, Comparison of Nine Commercially Available Clostridium difficile Toxin Detection Assays, a Real-Time PCR Assay for C. difficile tcdB, and a Glutamate Dehydrogenase Detection Assay to Cytotoxin Testing and Cytotoxigenic Culture Methods, Journal of Clinical Microbiology, Oct. 2009, p. 3211 3217 vol. 47, No. 10.
Javier P. Gisbert, MD, et al., Fecal Calprotectin and Lactoferrin for the Prediction of Inflammatory Bowel Disease Relapse, Inflamm Bowel Dis_ vol. 15, Nos. Aug. 2009.
CerTest instructions for use: Pol. Industrial Río Gállego II, Calle J, N° 1, 50840, San Mateo de Gállego, Zaragoza (Spain), www.certest.es.
Jieun Kim, M.D.. et al., Fecal Calprotectin Level Reflects the Severity of Clostridium difficile Infection, Ann Lab Med 2017;37:53-57.
C A Lamb, J C Mansfield, Measurement of faecal calprotectin and lactoferrin in inflammatory bowel disease, Frontline Gastroenterology 2011;2:13-18. doi:10.1136/fg.2010.001362.
Cathal J. McElgunn, et al., A Low Complexity Rapid Molecular Method for Detection of Clostridium difficile in Stool, PLOS ONE, Jan. 2014 | vol. 9 | Issue 1 | e83808.
Chintan Modi, et al., Does the handling time of unrefrigerated human fecal specimens impact the detection of Clostridium difficile toxins in a hospital setting? Received: Jan. 1, 2010 / Accepted: Aug. 5, 2010 / Published online: Aug. 26, 2010 # Indian Society of Gastroenterology 2010.
Richard F. Louie, et al., Point-of-Care Testing: Millennium Technology for Critical Care, Laboratory Medicine vol. 31, No. Jul. 7, 2000.
Lee F. Schroeder, Economic Evaluation of Laboratory Testing Strategies for Hospital-Associated Clostridium difficile Infection, No. 2 Journal of Clinical Microbiology p. 489-496, Feb. 2014 vol. 52.
Fred C. Tenover, Laboratory Diagnosis of Clostridium difficile Infection Can Molecular Amplification Methods Move Us Out of Uncertainty?, The Journal of Molecular Diagnostics, vol. 13, No. 6, Nov. 2011.

* cited by examiner

600

6042
6046
6056
6050
604
6022
6048
6034
602
6028
6052
6044
6058
6054
6024
6038
6026
6036

600

6042
6046
6050
6056
604
6022
6048
602
6058
6028
6058
6044
6054
6024
6038
6026
6036

SYSTEMS AND ASSEMBLIES FOR POINT-OF-CARE FLUIDIC ASSAYS

CROSS REFERENCE TO RELATED APPLICATIONS

This application claims the benefit of Indian Patent Application Ser. No. 201911026299, filed Jul. 1, 2019, the entirety of which is incorporated by reference herein for all purposes.

FIELD OF THE INVENTION

The invention relates to point-of-care fluidic assays. In particular, the invention provides systems and assemblies for performing point-of-care, fluidic assays—preferably involving self-contained, portable fluidic assay systems or assemblies.

BACKGROUND

The present invention relates to solutions for point-of-care fluidic assays.

Procedures for performing fluidic assay-based diagnostic tests normally involve six steps obtaining a sample for testing combining the sample with a fluid (for example, a buffer dilutent, reagent, or other liquid) dispersing the sample with the fluid to create a fluid-assay sample mixture (normally via agitating the mixture to create a uniform dispersion of contents or homogenous fluid) delivering the mixed fluid to an assaying assembly (for example, a substrate, membrane, pad, strip, chamber, well, or other containment location) waiting for the fluid to sufficiently react with the assaying assembly, and displaying a test result.

As shown in FIG. 1A, prior art solutions involve a sampling rod 102 and a sampling receptacle 104. Sampling rod 102 comprises a shaft like apparatus having a first end 1022 that is proximal to a person collecting the sample, and a second end 1024 that is distal to the person collecting the sample. First end 1022 may be configured to have a gripping portion that enables sampling rod to be gripped and manipulated by the person collecting the sample. Second end 1024 may be shaped or configured to enable collection of a portion of sample 106—for example by having a textured surface that causes a portion of sample 106 to adhere thereto, or by having a scoop like structure that is capable of scooping or retaining a portion of sample 106.

Sampling receptacle 104 comprises a hollow tube-like housing that is open at a first end 1042 that is proximal to a person holding the sampling receptacle 104, and a closeable second end 1044 that is distal to the person holding the sampling receptacle 104, and at least one sidewall 1050 between the open first end 1042 and closeable second end 1044, said sidewall 1050 defining a fluid chamber 1046 that is used to store a fluid 1048 (for example a buffer, diluent, reagent or other liquid). As shown in FIG. 1A, the housing of sampling receptacle 104 may configured to have a syringe or dropper shape. As shown in FIG. 1A, the closeable second end 1044 is initially in a closed position which enables the fluid 1048 to be retained fluid chamber 1046. First end 1042 may be closed using a stopper or other closure (not shown) for transportation and storage—and the stopper or other closure may be removed from first end 1042 for adding the sample that has been collected using sampling rod 102.

FIG. 1B illustrates the next step of operation within the prior art, wherein the second end 1024 of sampling rod 102 is inserted into sampling receptacle 104 through open first end 1042 of sampling receptacle 104, such that the second end 1024 of sampling rod 102 is inserted into fluid chamber 1046—where the sample disposed or collected on the second end 1024 of sampling rod 102 comes into contact with the fluid 1048 stored in fluid chamber 1046. As shown in FIG. 1B, first end 1022 of sampling rod 102 may be configured to form a stopper sized to sealingly close open first end 1042 of sampling receptacle 104 when sampling rod 102 is inserted into sampling receptacle 104. As a result, once sampling rod 102 has been inserted into sampling receptacle 104, and first end 1022 of sampling rod 102 sealingly closes open first end 1042 of sampling receptacle 104, the entire assembly may be agitated—for example by shaking gently or vigorously, to ensure that the sample disposed or collected on the second end 1024 of sampling rod 102 comes into contact with the fluid 1048 stored in fluid chamber 1046 and is dispersed uniformly through said fluid 1048 within fluid chamber 1046.

As shown in FIG. 1C, subsequent to agitation of the assembly and dispersion of the sample within fluid 1048, the closeable second end 1044 of sampling receptacle 104 may be opened—thereby forming an outlet or aperture 1052 at the second end 1044 of sampling receptacle 104—to enable the fluid-assay sample mix to exit the sampling receptacle 104. In an embodiment of the invention closeable second end 1044 of sampling receptacle 104 may comprise a removeable or frangible tip cap that can be removed or broken to open second end 1044 of sampling receptacle 104.

As shown in FIG. 1C the outlet or aperture 1052 may be positioned so as to deliver the fluid-assay sample mix onto an assaying assembly 108 (for example, an assay substrate, assay membrane, assay pad, assay chamber or assay well). Assaying assembly 108 may be configured to include a sample-fluid receptacle 1028—onto which the fluid-assay sample mix is delivered through outlet or aperture 1052, whereafter, the fluid-assay sample mix causes one or more reactions within assaying assembly 108 to cause a visual or other indication through indicator 1084—establishing a test result.

Many care providers are not even aware of these solutions, and while potentially able to be done by care providers and patients, these solutions are still normally performed by laboratory technicians.

Further, the prior art solutions described above have many associated drawbacks. First, owing to the plurality of components (sampling rod, sampling receptacle and assaying assembly) it becomes complicated for the user to operate. This is even more the case where the operator is the patient herself/himself and not a trained healthcare provider. Second, depending on the nature of the sample itself (for example, blood, stool, semen, or other biological solids, semi-solids or liquids) the open nature of the various components, and the necessity for handling and manipulating each component gives rise to hygiene as well as contamination concerns. Yet further, almost all assaying assemblies are configured to provide optimal results when a specific amount of the fluid-assay sample mix is delivered onto such assaying assemblies. As a result, controlled delivery of the fluid-assay sample mix (in precisely metered quantities) from sampling receptacle 104 is critical to obtaining reliable results—and such controlled delivery presents further problems, especially where the person handling the various components and assemblies is a patient and not a trained health care provider.

There is accordingly a need for an apparatus or assembly which addresses the above drawbacks.

SUMMARY

The invention relates to the domain of fluidic assays and provides systems and assemblies for performing point-of-care, fluidic assays—preferably involving self-contained, portable fluidic assay systems or assemblies.

In an embodiment, the invention comprises an assembly for point-of-care fluidic assaying. The assembly comprises a housing having at least one fluid chamber formed therewithin—wherein the fluid chamber holds a defined quantity of fluid that is intended to be mixed with an assay sample that is intended to be assayed. The housing includes an inlet configured to enable inspiration of a quantity of the assay sample into the housing, through actuation of an inspiration stroke or inspiration cycle. The housing is configured such that the inspirated quantity of the assay sample is exposed to the fluid stored in the housing—thereby enabling the assay sample to disperse within the stored fluid. The housing further includes an outlet configured to enable controlled expiration of a quantity of the fluid-assay sample mixture or solution from the housing onto an assaying assembly—through actuation of an expiration stroke or expiration cycle. In an embodiment of the invention, the assaying assembly may be integrated into the assembly for point-of-care fluidic assaying—and may be located and positioned such that the assay fluid-assay sample mixture that is expelled from the outlet of the housing—is delivered into a receptacle or chamber provided on the assaying assembly for the purpose of receiving the fluid-assay sample mixture for the purpose of the fluidic assay. The assembly for point-of-care fluidic assaying may be configured such that the expirated assay fluid-assay sample mixture is delivered from the housing onto the assaying assembly in a controlled or metered quantity.

In one embodiment, the invention provides a fluidic assay assembly comprising (i) a housing comprising an inlet opening, an outlet opening, and at least one fluid chamber formed within the housing, wherein the fluid chamber is configured to hold a fluid intended for mixing with an assay sample, (ii) an assaying assembly comprising a receptacle for receiving a fluid-assay sample mixture, the receptacle of the assaying assembly is in fluid communication with the outlet opening, (iii) an inspiration actuator configured to draw the assay sample from the inlet opening into a region of the housing where the assay sample contacts the fluid from the fluid chamber to form the fluid-assay sample mixture, and (iv) an expulsion actuator configured to expel the fluid-assay sample mixture through the outlet opening to the receptacle of the assaying assembly.

In an embodiment of the fluidic assay assembly (i) the inlet opening has a one-way valve disposed thereon, wherein the one-way valve disposed on the inlet opening is configured to restrict expulsion of fluid or matter from the housing through the inlet opening, or (ii) the outlet opening has a one-way valve disposed thereon, wherein the one-way valve disposed on the outlet opening is configured to restrict fluid or matter from entering the housing through the outlet opening.

In an embodiment of the fluidic assay assembly, the fluid is any one of a buffer, diluent, or reagent or other similar fluid.

In a particular embodiment of the fluidic assay assembly, the assaying assembly is configured to provide a visual indicator in response to being contacted by one or more target analytes within the fluid-assay sample mixture.

In another embodiment of the fluidic assay assembly, the assaying assembly includes any one or more of an assay substrate, assay membrane, assay pad, assay chamber or assay well.

In a specific embodiment, the housing has a plunger disposed therewithin, and wherein said plunger is one of the components within one or both of the inspiration actuator and the expulsion actuator. The plunger may comprise a reciprocable plunger configured such that (i) movement of the plunger in a first direction implements an inspiration stroke for drawing the assay sample from the inlet opening into the region of the housing where the assay sample contacts the fluid from the fluid chamber, and (ii) movement of the plunger in a second direction opposite to the first direction implements an expulsion stroke for expelling the fluid-assay sample mixture through the outlet opening to the receptacle of the assaying assembly.

The housing may include a resilient member configured to urge the plunger in one of the first direction and the second direction.

In an embodiment of the fluidic assay assembly, the plunger is configured such that (i) movement of the plunger in a first direction implements an inspiration stroke for drawing the assay sample from the inlet opening into the region of the housing where the assay sample contacts the fluid from the fluid chamber, and (ii) continued movement of the plunger in the first direction implements an expulsion stroke for expelling the fluid-assay sample mixture through the outlet opening to the receptacle of the assaying assembly.

In a particular embodiment of the fluidic assay assembly, the region of the housing where the assay sample contacts the fluid from the fluid chamber, partially or wholly coincides with the fluid chamber.

The fluidic assay assembly may include at least one mixer component configured to generate turbulence within one or more of the assay sample, the fluid intended for mixing with the assay sample, and the fluid-assay sample, for accelerated and homogenous mixing of the fluid and assay sample.

In an embodiment of the fluidic assay assembly, the housing has a plunger disposed therewithin, and the at least one mixer component comprises one or more grooves or channels formed on one or more inner walls of the housing.

In a further embodiment of the fluidic assay assembly, the housing has a plunger disposed therewithin, and the at least one mixer component comprises one or more grooves or channels formed within or on a plunger head.

In an embodiment of the fluidic assay assembly, the mixing component comprises a part of the housing having pliant characteristics.

The invention further provides a kit for performing a fluidic assay. The kit comprises (i) a fluidic assay assembly comprising at least a housing comprising an inlet opening, an outlet opening, and at least one fluid chamber formed within the housing, wherein the fluid chamber is configured to hold a fluid intended for mixing with an assay sample, (ii) an assaying assembly comprising a receptacle for receiving a fluid-assay sample mixture, the receptacle of the assaying assembly is in fluid communication with the outlet opening, (iii) an inspiration actuator configured to draw the assay sample from the inlet opening into a region of the housing where the assay sample contacts the fluid from the fluid chamber to form the fluid-assay sample mixture, and (iv) an expulsion actuator configured to expel the fluid-assay sample mixture through the outlet opening to the receptacle of the assaying assembly.

The invention and more specific embodiments are discussed in more detail below.

BRIEF DESCRIPTION OF THE ACCOMPANYING DRAWINGS

DETAILED DESCRIPTION

Figure 1A:
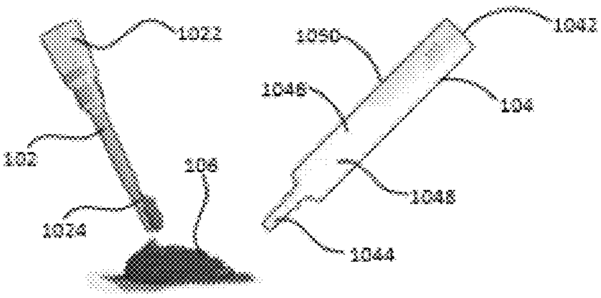
Figure 1A (Prior Art)
FIGS. 1A to 1C illustrate prior art solutions for fluidic assaying.
Figure 1B:
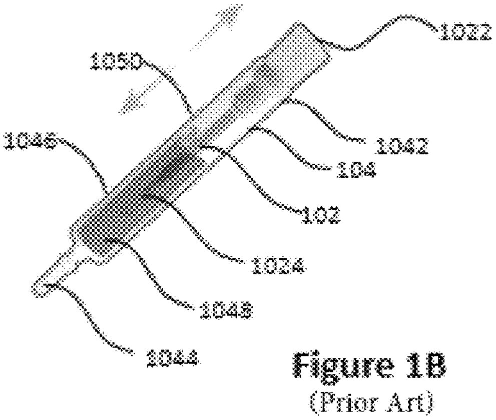
Figure 1B (Prior Art)
Figure 1C:
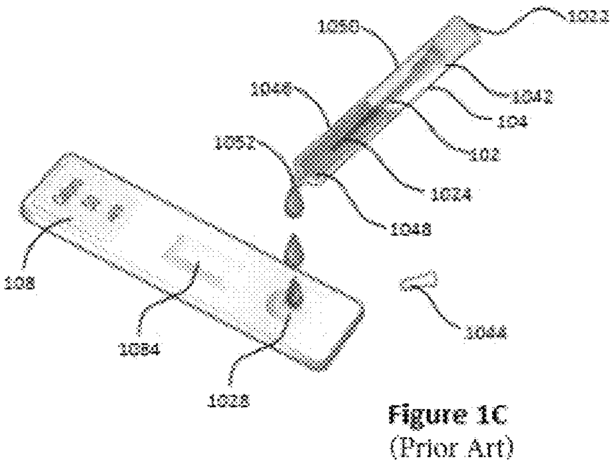
Figure 1C (Prior Art)

The invention provides systems and assemblies for point-of-care fluidic assays.

FIGS. 2A to 2D illustrate a first embodiment of an assembly 200 for fluidic assaying in accordance with the teachings of the present invention.

Assembly 200 comprises a housing 202 comprising a closed first end 204 that is positioned proximal to a person operating assembly 200, an open second end 206 that is positioned distal to a person operating assembly 200 and a sidewall 208 connecting first end 204 and second end 206 and forming a lumen 210 therebetween. Disposed within lumen 210 is a reciprocable plunger assembly 212 comprising a first striker head 214 located proximal to the person operating assembly 200, a second piston head 216 located distal to the person operating assembly 200, and a shaft 218 connecting said first striker head 214 and second piston head 216. Reciprocable plunger assembly 212 additionally includes a slider 220 connected to reciprocable plunger assembly 212 and positioned outside of housing 202—wherein slider 220 is slidingly seated within a groove or channel 222 formed on sidewall 208 of housing 202, and is configured to be moved along said groove or channel 222 in the direction of either closed first end 204 or open second end 206. In the illustrated embodiment, slider 220 is connected to reciprocable plunger assembly 212 through a mount (not shown) formed on shaft 218. Movement of slider 220 is transmitted to shaft 218 through the mount and results in corresponding movement of the two heads 214, 216 of reciprocable plunger assembly 212 in the same direction as slider 220.

As illustrated in FIGS. 2A to 2D, housing 202 includes a fluid tight seal 244 formed within lumen 210 and positioned between nozzle 224 and closed first end 204. The fluid tight seal 244 may comprise a resilient stopper or any other sealing structure—and is immoveably affixed to the internal sidewalls of lumen 210. As illustrated, fluid tight seal 244 includes an aperture formed therein—which aperture permits shaft 218 of reciprocable plunger assembly 212 to pass therethrough. In particular, reciprocable plunger assembly 212 is configured such that shaft 218 passes through the aperture formed in fluid tight seal 244, while the heads 214 and 216 are positioned respectively on either side of said fluid tight seal. The aperture in fluid tight seal 244 and shaft 218 are respectively sized so as to permit reciprocating movement of shaft 218 through said aperture, in response to movement of slider 220 in a longitudinal direction between open second end 206 and closed first end 204. Additionally, fluid tight seal 244, the aperture therewithin and shaft 218 are respectively configured to ensure that despite the sliding arrangement, a fluid tight seal is also maintained between the external periphery of shaft 218 and the internal periphery of the aperture within fluid tight seal 244.

As illustrated in FIGS. 2A to 2D, open second end 206 of housing 202 may be formed as an inspiration nozzle 224 configured to permit inspiration of an assay sample from open second end 206 into housing 202. Inspiration nozzle 224 additionally includes a one-way valve 226 positioned between open second end 206 and lumen 210 of housing 202—which one way valve may be configured to permit for inspiration of an assay sample into lumen 210 while simultaneously preventing expiration of any solid or liquid matter from within lumen 210.

Housing 202 additionally includes an expiration outlet 228 configured to enable expiration of solid or liquid matter from lumen 210. Housing 202 also includes a one-way valve 230 positioned on or between expiration outlet 228 and lumen 210—which one way valve may be configured to permit for expiration of an fluid-assay sample mixture from within lumen 210 while preventing inspiration of any solid, liquid or fluid (such as air) through expiration outlet 228. In an embodiment of the invention, expiration outlet 228 is configured to deliver a fluid-assay sample mixture from within lumen 210 onto assaying assembly 232 that is configured to receive the fluid-assay sample mixture from expiration outlet 228 and to provide a visual or other indicator of a result of the fluidic assay. In a particular embodiment, the fluid-assay sample mixture is delivered through expiration outlet 228 onto a sample-fluid receptacle (or delivery region) 234 provided within the assaying assembly—whereinafter the fluid-assay sample mixture causes one or more reactions within assaying assembly 232 to cause a visual or other indication through indicator 236 provided within assaying assembly 232. In an embodiment, assaying assembly 232 may comprise any of an assay substrate, assay membrane, assay pad, assay chamber or assay well.

Housing 202 may additionally include a first aperture 238 formed on sidewall 208 in relative proximity to closed first end 204 of housing 202, and a second aperture 240 formed on sidewall 208 in relative proximity to expiration outlet 228, and a fluid conduit (for example, a lumen) 242 connecting first aperture 238 and second aperture 240. Second aperture 240 may optionally have disposed thereon or therein, a one-way valve 250 that permits for fluid to be driven from fluid conduit 242 through second aperture 240 and into lumen 210, while simultaneously preventing solids of fluids from being drawn through second aperture 240 into fluid conduit 242. It will be noted that both of first aperture 238 and second aperture 240 open into lumen 210 and are respectively positioned such that the distance between first striker head 214 and second piston head 216 on reciprocable plunger assembly 212 is less than the distance between first aperture 238 and second aperture 240.

Figure 2A:
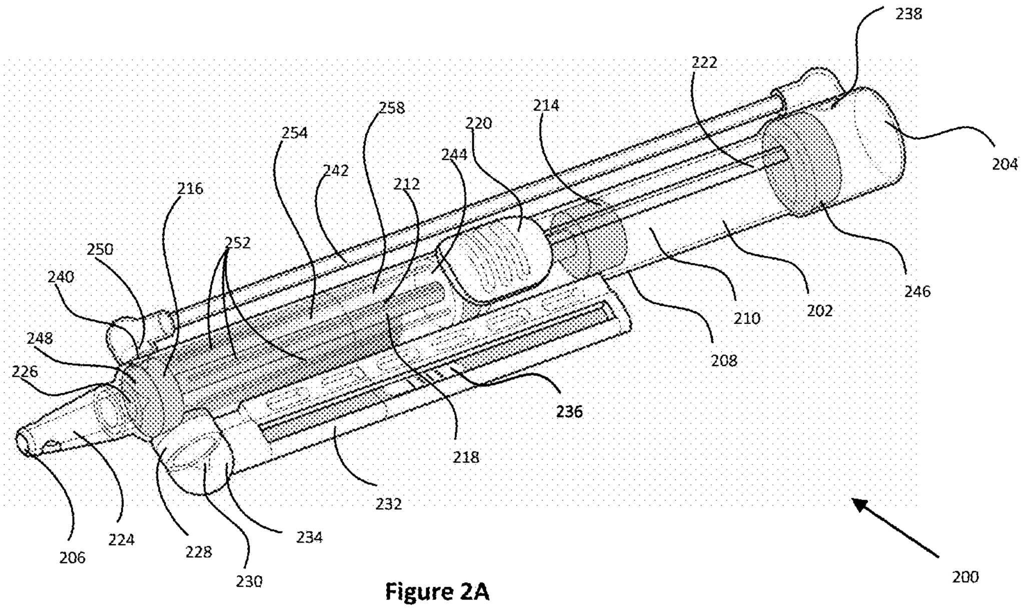
FIGS. 2A to 2D illustrate a first embodiment of an assembly for fluidic assaying in accordance with the teachings of the present invention.
Figure 2B:
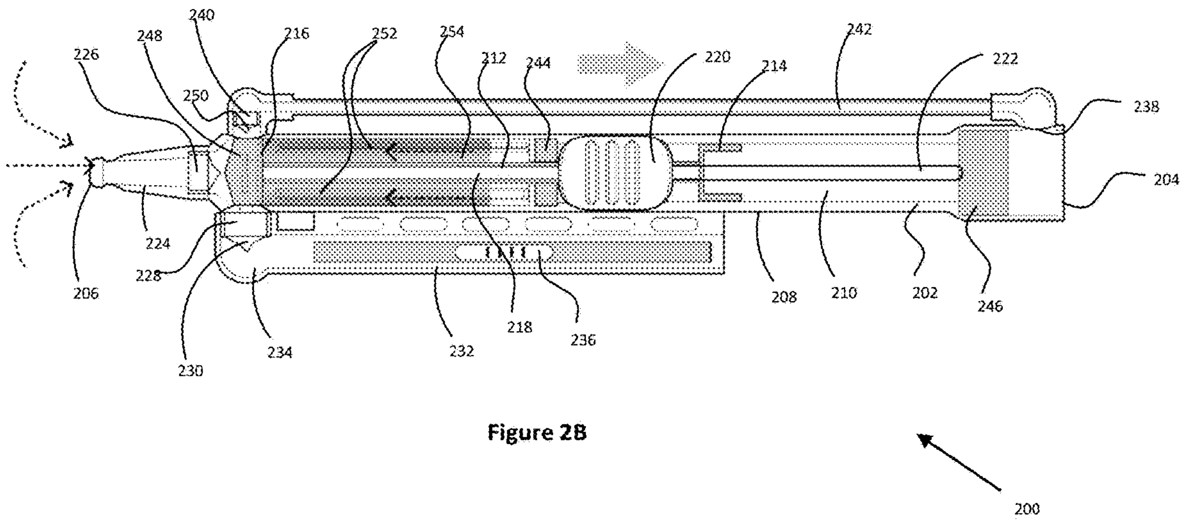

As shown in FIGS. 2A to 2D, resilient stopper 246 is positioned and sized within lumen 210 so as to form a fluid tight seal against the internal wall surfaces of lumen 210, separating first striker head 214 and first aperture 238. As shown in FIGS. 2A and 2B, in an initial state prior to inspiration of an assay sample through inspiration nozzle 224, resilient stopper 246 is positioned a fixed distance away from closed first end 204—such that a defined volume or air or other fluid in held in the volume defined by the internal sidewalls of lumen 210, resilient stopper 246 at one end and closer first end at the other end. Further, the distance between resilient stopper 246 and closed first end is selected such that a first aperture 238 lies between resilient stopper 246 and closed first end 204 of housing 202. Movement of resilient stopper 246 from its initial position prior to inspiration of an assay sample through inspiration nozzle 224, in the direction of closed first end 204 of housing 202 results in air (that is positioned between resilient stopper 246 and closed first end 204) within lumen 210 being driven out of lumen 210 from first aperture 238 through fluid conduit 242 and back into lumen 210 through second aperture 240.

Second piston head 216 formed on reciprocable plunger assembly 212 has a resilient plunger head 248 disposed thereon, which resilient plunger head 248 is sized and positioned to form a fluid tight seal against the internal wall surfaces of lumen 210.

Internal wall surfaces of lumen 210 are provided with one or more mixing components configured to generate turbulence within one or more of the assay sample, the fluid intended for mixing with the assay sample, and the fluid-assay sample, for improving mixing of the fluid and assay sample. In an embodiment the one or more mixing components comprise grooves or channels 252 formed in a longitudinal direction on the internal wall surfaces of lumen 210. Said grooves or channels 252 may be formed by scoring or forming grooves on the internal wall surfaces of lumen 210 or alternatively by forming one or more raised ribs on the internal wall surfaces of lumen 210—which raised ribs would have the effect of forming channels or grooves 252 therebetween. Grooves or channels 252 are formed such that when resilient plunger head 248 is positioned at a portion of lumen 210 where said grooves or channels 252 have been formed at internal wall surfaces of lumen 210, said grooves or channels 252 form one or more fluid passageways around resilient plunger head 248, which fluid passageways permit fluid to pass from a region of the lumen 210 that is proximal to resilient plunger heat 248 to a region of the lumen 210 that is proximal to inspiration nozzle 224.

Further, grooves or channels 252 are formed at locations on the internal wall surfaces of lumen 210 such that in an initial state prior to inspiration of an assay sample through inspiration nozzle 224, when resilient plunger head 248 is positioned in a first position relatively proximal to (and preferably flush against) inspiration nozzle 224, resilient plunger head 248 is not in contact with said grooves or channels 252—and only comes into contact with said grooves or channels 252 as resilient plunger head 248 is withdrawn in the direction of closed first end 204 (for example by action of slider 220) as part of the inspiration stroke of assembly 200.

As will be explained in detail below, the configuration of assembly 200 permits for an inspiration stroke wherein an assay sample is drawn into the assembly 200 and is simultaneously mixed with a pre-filled fluid stored within assembly 200, and for an expiration stroke, wherein a controlled amount of the fluid-assay sample mixture is expelled from the assembly 200 onto an assaying assembly for the purposes of generating a fluidic assay result. The operation of assembly 200 as well as the inspiration and expiration strokes are explained in more detail with reference to FIGS. 2A to 2D.

Figure 2C:
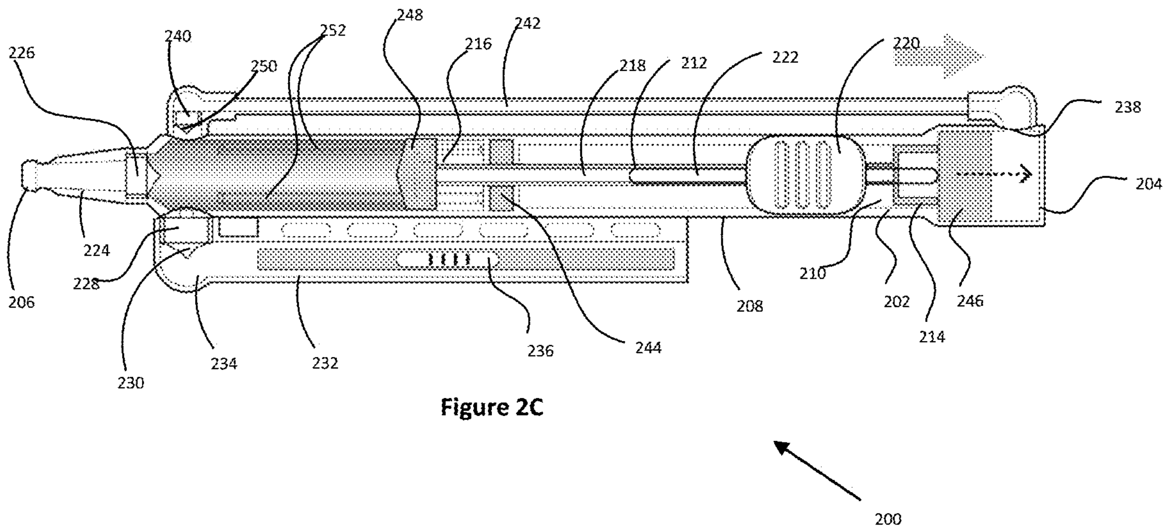
Figure 2D:
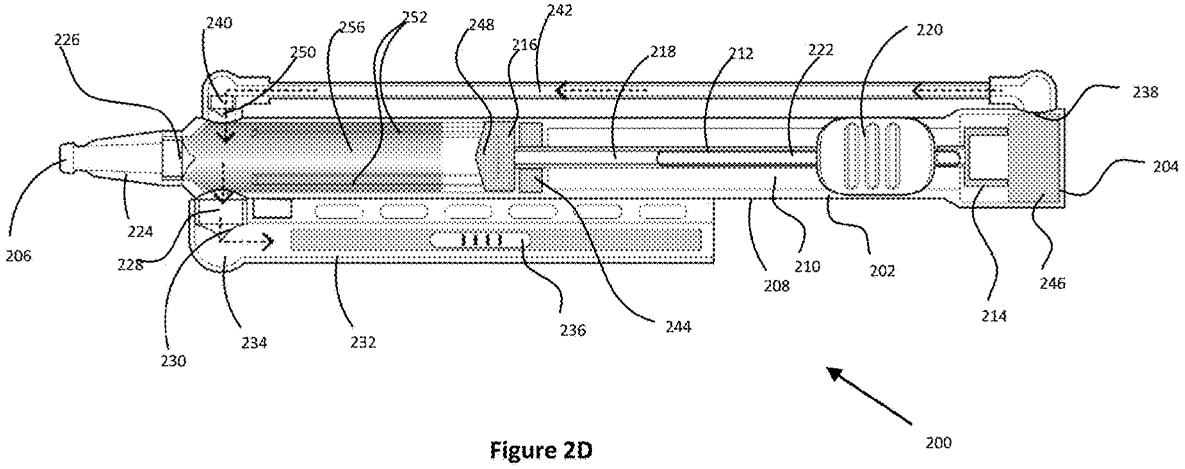

FIG. 2A illustrates assembly 200 in an initial state prior to commencement of the inspiration stroke. FIG. 2B illustrates assembly 200 during the inspiration stroke and prior to commencement of the expiration stroke. FIG. 2C illustrates assembly 200 during the expiration stroke. FIG. 2D illustrates assembly 200 subsequent to completion of the expiration stroke.

As shown in FIG. 2A, the initial state of assembly 200 (prior to commencement of the inspiration stroke) is a prefilled state in which a defined quantity of a prefilled fluid 254 (for example, a fluid or liquid buffer, diluent, reactant, reagent or any other fluid or liquid) is stored within a fluid chamber formed within lumen 210. As shown in FIG. 2A, the fluid chamber within which the prefilled fluid 254 is stored is a fluid chamber defined by the inner sidewall surfaces of lumen 210, resilient plunger head 248 at one end, and fluid tight seal 244 at the other end. It would be understood that the fluid tight seals formed by the resilient plunger head 248 at one end and by the fluid tight seal 244 at the other end prevents inadvertent leakage or escape of the prefilled fluid 254 from said fluid chamber.

As shown in FIG. 2A, in the initial state, in addition to the prefilled fluid 254, the fluid chamber defined by the inner sidewall surfaces of lumen 210, resilient plunger head 248 at one end, and fluid tight seal 244 additionally contains a certain quantity (or volume) of air (or other fluid) 258.

It will be particularly noted from FIG. 2A that in its initial state, the resilient plunger head 248 at one end and the fluid tight seal 244 at the other end are respectively positioned on either side of grooves or channels 252, such that said the entire body of grooves or channels 252 lie between the resilient plunger head 248 and fluid tight seal 244, which ensures that said grooves or channels 252 do not interfere with or impair the fluid tight seals formed at either end of the fluid chamber in which the prefilled fluid 254 is stored. In a preferred embodiment, in its initial state illustrated in FIG. 2A, resilient plunger head 248 is positioned flush against or in abutment with nozzle 224.

FIG. 2B illustrates the inspiration stroke/inspiration action of assembly 200.

During operation of assembly 200, the nozzle 224 of assembly 200 (in its initial state as shown in FIG. 2A) may be dipped or inserted into a quantity of the assay sample that is sought to be assayed. Thereafter, as shown in FIG. 2B, an operator may commence moving reciprocable plunger assembly 212 (for example, by applying a pushing or pulling force on slider 220) in a direction from nozzle 224 towards closed first end 204. Movement of reciprocable plunger assembly 212 in a direction towards closed first end 204 of housing 202 results in piston head 216 and resilient plunger head 248 being moved away from nozzle 224 and in the direction of closed first end 204. Since resilient plunger head 248 is in fluid right engagement with the internal sidewalls of lumen 210, withdrawing said resilient plunger head 248 in a direction away from nozzle 224 and towards closed first end 204 generates a vacuum or partial vacuum within lumen 210 both at and proximal to nozzle 224. Said vacuum or partial vacuum causes some part of the assay sample to be drawn into lumen 210 through open second end 206 and nozzle 224—into a portion of lumen 210 that is situated between nozzle 224 and resilient plunger head 248.

Simultaneously, the withdrawing of resilient plunger head 248 towards closed first end 204—causes resilient plunger head 248 to move towards fluid tight seal 244—thereby causing a progressive contraction or shrinkage in the volume of the fluid chamber defined by the inner sidewall surfaces of lumen 210, resilient plunger head 248 at one end, and fluid tight seal 244. The contraction in volume of the fluid chamber causes an increase in pressure on the prefilled fluid 254 that is housed in said fluid chamber. Further, as resilient plunger head 248 reaches a region of lumen 210 that has grooves or channels 252 formed on the internal sidewalls of said lumen 210, said grooves or channels provide one or more fluid passageways that permit prefilled fluid 254 to escape from the fluid chamber (defined by the inner sidewall surfaces of lumen 210, resilient plunger head 248 at one end, and fluid tight seal 244) and into the portion of lumen 210 between nozzle 224 and resilient plunger head 248. Since the prefilled fluid 254 is being transferred from a high-pressure region of lumen 210 (between resilient plunger head 248 and fluid tight seal 244) to a lower pressure region within lumen 210 (between resilient plunger head 248 and nozzle 224), the fluid travels through said channels or grooves 252 in pressured jets or streams and mixes with the portion of the assay sample that has been drawn into lumen 210 through nozzle 224. The pressured streams cause the prefilled fluid 254 and assay sample to be agitated and satisfactorily mixed together—thereby forming a fluid-assay sample mixture 256 within the portion of lumen 210 between nozzle 224 and resilient plunger head 248.

Withdrawal of resilient plunger head 248 in the direction of closed first end 204 may in an embodiment continue until resilient plunger head 248 or other portion of reciprocable plunger assembly 212 meets a positive stop or abutment surface that prevent further rearward travel. In an embodiment, this abutment surface is provided by fluid tight seal 244, wherein resilient plunger head 248 is withdrawn in the direction of closed first end 204 until it comes into contact with fluid tight seal 244. It would be understood that by withdrawing resilient plunger head 248 until it comes into contact with fluid tight seal 244 during the inspiration stroke, it can be ensured that the entire volume of the prefilled fluid 254 is forced from a region of lumen 210 between the resilient plunger head 248 and the fluid tight seal 244 to a region of lumen 210 between nozzle 224 and resilient plunger head 248—for the purposes of mixing with the assay sample that has been drawn into lumen 210.

FIG. 2C illustrates the expiration stroke/expiration action of assembly 200. It will be noted that in the embodiment of FIG. 2C, the expiration stroke is a continuation of the action commenced in the inspiration stroke described above in connection with FIG. 2B. As shown in FIG. 2C, the expiration stroke of assembly 200 comprises continuing the movement of slider 220, and through slider 220, the movement of reciprocable plunger assembly 212, in the direction of closed first end 204. The movement is continued until first striker head 214 comes into contact with resilient stopper 246. Thereafter, further movement of reciprocable plunger assembly 212 in a direction towards closed first end 204 causes first striker head 214 to apply a force on resilient stopper 246—which in turn forces resilient stopper 246 towards closed first end 204.

As a result of the fluid tight seal formed between resilient stopper 246 and internal wall surfaces of lumen 210, movement of resilient stopper 246 from its initial position prior to inspiration of an assay sample through inspiration nozzle 224, in the direction of closed first end 204 of housing 202 results in air or other fluid (that is held in the volume of lumen 210 defined by internal side walls of lumen 210, resilient stopper 246 and closed first end 204) being driven out of lumen 210 from first aperture 238 through fluid conduit 242 and back into lumen 210 through second aperture 240.

As shown in FIG. 2D, the action of driving air or other fluid through fluid conduit 242 and back into lumen 210 through second aperture 240 simultaneously has the effect of expelling a quantity of the fluid-assay sample mixture that is held in lumen 210 at a region between nozzle 224 and resilient plunger head 248 from lumen 210 and out of expiration outlet 228.

In an embodiment where expiration outlet 228 is positioned appropriately with respect to the region of an assaying assembly 232, the expiration stroke has the effect of driving a defined quantity of the fluid-assay sample mix from within lumen 210 onto assaying assembly 232 through expiration outlet 228—whereafter the assaying assembly provides a visual or other indicator of a result of the fluidic assay. In a particular embodiment, the expiration outlet is positions such that the fluid-assay sample mix 256 is delivered through expiration outlet 228 onto a sample-fluid receptacle (or delivery region) 234 provided within the assaying assembly—whereinafter the fluid-assay sample mix causes one or more reactions within assaying assembly 232 to cause a visual or other indication through indicator 236 provided within assaying assembly 232.

It would be understood that the volume of fluid-assay sample mix that is expelled from expiration outlet 228 is dependent on the volume of air that is driven out of second aperture 240, and that by configuring the volume of air that is driven out of said aperture 240 (for example by controlling the volume of air stored between resilient stopper 246 and closed first end 204 of housing 202) a precisely metered quantity of fluid-assay sample mix 256 can be delivered from housing 202 onto assaying assembly 232.

FIGS. 3A to 3D illustrate a second embodiment of an assembly 300 for fluidic assaying in accordance with the teachings of the present invention.

Assembly 300 comprises a housing 302 comprising a closed first end 304 that is positioned proximal to a person operating assembly 300, an open second end 306 that is positioned distal to a person operating assembly 300 and a sidewall 308 connecting closed first end 304 and open second end 306 and forming a lumen 310 therebetween. Disposed within lumen 310 is a reciprocable plunger assembly 312 comprising a compressible air reservoir 314 (for example a bellow arrangement) located proximal to the person operating assembly 300, a piston head 316 located distal to the person operating assembly 300, and a shaft 318 connecting said compressible air reservoir 314 and piston head 316. Shaft 318 comprises a cannula having a lumen 342 therewithin. A first end 338 of lumen 342 is in fluid communication with an internal volume of compressible air reservoir 314. Lumen 342 passes through piston head 316 and at a second end forms an opening 340 on a resilient plunger head 348 that is disposed on piston head 316, such that a fluid passageway is formed between compressible air reservoir 314 and the opening 340 on resilient plunger head 348. As a result, compression of compressible air reservoir 314 results in air or other fluid that is stored within compressible air reservoir 314 being driven through lumen 342 and out of opening 340 that is formed on resilient plunger head 348.

In an embodiment, resilient plunger head 348 may be sized and positioned to form a fluid tight seal against the internal wall surfaces of lumen 310.

Reciprocable plunger assembly 312 additionally includes a slider 320 connected to reciprocable plunger assembly 312 and positioned outside of housing 302—wherein slider 320 is slidingly seated within a groove or channel 322 formed on sidewall 308 of housing 302, and is configured to be moved along said groove or channel 322 in the direction of either closed first end 304 or open second end 306. In the illustrated embodiment, slider 320 is connected to reciprocable plunger assembly 312 through a mount (not shown) formed on shaft 318. Movement of slider 320 is transmitted to shaft 318 through the mount and results in corresponding movement of the compressible air reservoir 314 and piston head 316 of reciprocable plunger assembly 312 in the same direction as slider 320.

As illustrated in FIGS. 3A to 3D, housing 302 includes a fluid tight seal 344 formed within lumen 310 and positioned between nozzle 324 and closed first end 304. The fluid tight seal 344 may comprise a resilient stopper or any other sealing structure—and is immoveably affixed to the internal sidewalls of lumen 310. As illustrated, fluid tight seal 344 includes an aperture formed therein—which aperture permits shaft 318 of reciprocable plunger assembly 312 to pass therethrough. In particular, reciprocable plunger assembly 312 is configured such that shaft 318 passes through the aperture formed in fluid tight seal 344, while compressible air reservoir 314 and piston head 316 are positioned respectively on either side of said fluid tight seal 344. The aperture in fluid tight seal 344 and shaft 318 are respectively sized so as to permit reciprocating movement of shaft 318 through said aperture, in response to movement of slider 320 in a longitudinal direction between open second end 306 and closed first end 304. Additionally, fluid tight seal 344, the aperture therewithin and shaft 318 are respectively configured to ensure that despite the sliding arrangement, a fluid tight seal is also maintained between the external periphery of shaft 318 and the internal periphery of the aperture within fluid tight seal 344.

As illustrated in FIGS. 3A to 3D, open second end 306 of housing 302 may be formed as an inspiration nozzle 324 configured to permit inspiration of an assay sample from open second end 306 into housing 302. Inspiration nozzle 324 additionally includes a one-way valve 326 positioned between open second end 306 and lumen 310 of housing 302—which one way valve may be configured to permit for inspiration of an assay sample into lumen 310 while simultaneously preventing expiration of any solid or liquid matter from within lumen 310.

Housing 302 additionally includes an expiration outlet 328 configured to enable expiration of solid or liquid matter from lumen 310. Housing 302 also includes a one-way valve 330 positioned on or between expiration outlet 328 and lumen 310—which one way valve may be configured to permit for expiration of a fluid-assay sample mix from within lumen 310 while preventing inspiration of any solid, liquid or fluid (such as air) through expiration outlet 328. In an embodiment of the invention, expiration outlet 328 is configured to deliver a fluid-assay sample mix from within lumen 310 onto assaying assembly 332 that is configured to receive the fluid-assay sample mix from expiration outlet 328 and to provide a visual or other indicator of a result of the fluidic assay. In a particular embodiment, the fluid-assay sample mixture is delivered through expiration outlet 328 onto a sample-fluid receptacle (or delivery region) 334 provided within the assaying assembly—whereinafter the fluid-assay sample mixture causes one or more reactions within assaying assembly 332 to cause a visual or other indication through indicator 336 provided within assaying assembly 332. In an embodiment, assaying assembly 332 may comprise any of an assay substrate, assay membrane, assay pad, assay chamber or assay well.

Internal wall surfaces of lumen 310 are provided with one or more mixing components configured to generate turbulence within one or more of the assay sample, the fluid intended for mixing with the assay sample, and the fluid-assay sample, for improving mixing of the fluid and assay sample. In an embodiment the one or more mixing components comprise grooves or channels 352 formed in a longitudinal direction on the internal wall surfaces of lumen 310. Said grooves or channels 352 may be formed by scoring or forming grooves on the internal wall surfaces of lumen 310 or alternatively by forming one or more raised ribs on the internal wall surfaces of lumen 310—which raised ribs would have the effect of forming channels or grooves 352 therebetween. Grooves or channels 352 are formed such that when resilient plunger head 348 is positioned at a portion of lumen 310 where said grooves or channels 352 have been formed at internal wall surfaces of lumen 310, said grooves or channels 352 form one or more fluid passageways around resilient plunger head 348, which fluid passageways permit fluid to pass from a region of the lumen 310 that is proximal to closed first end 304 to a region of the lumen 310 that is proximal to inspiration nozzle 324.

Further, grooves or channels 352 are formed at locations on the internal wall surfaces of lumen 310 such that in an initial state prior to inspiration of an assay sample through inspiration nozzle 324, when resilient plunger head 348 is positioned in a first position relatively proximal to (and preferably flush against) inspiration nozzle 324, resilient plunger head 348 is not in contact with said grooves or channels 352—and only comes into contact with said grooves or channels 352 as resilient plunger head 348 is withdrawn in the direction of closed first end 304 (for example by action of slider 320) as part of the inspiration stroke of assembly 300.

As will be explained in detail below, the configuration of assembly 300 permits for an inspiration stroke wherein an assay sample is drawn into the assembly 300 and is simultaneously mixed with a pre-filled fluid stored within assembly 300, and for an expiration stroke, wherein a controlled amount of the fluid-assay sample mix is expelled from the assembly 300 onto an assaying assembly for the purposes of generating a fluidic assay result. The operation of assembly 300 as well as the inspiration and expiration strokes are explained in more detail with reference to FIGS. 3A to 3D.

Figure 3A:
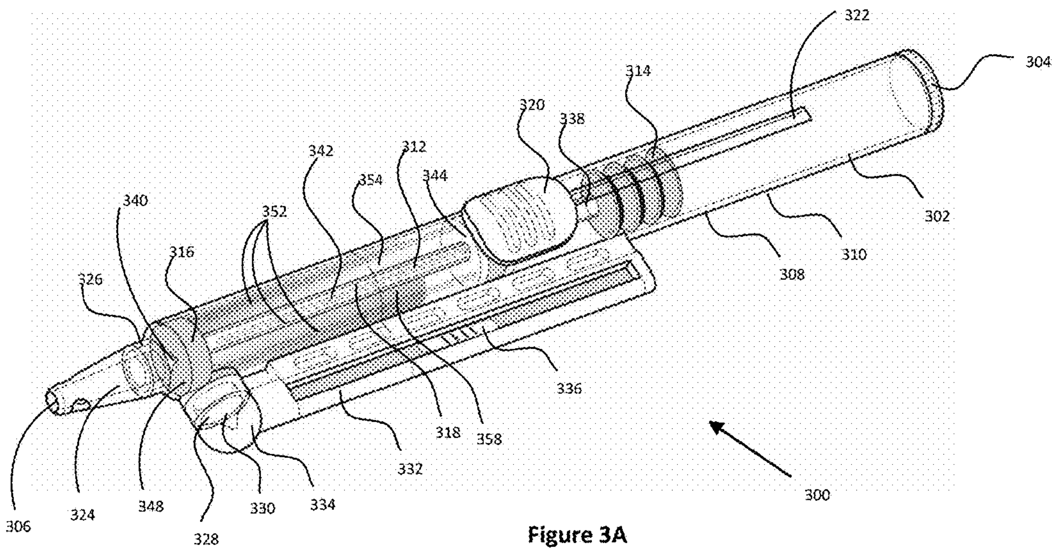
FIGS. 3A to 3D illustrate a second embodiment of an assembly for fluidic assaying in accordance with the teachings of the present invention.
Figure 3B:
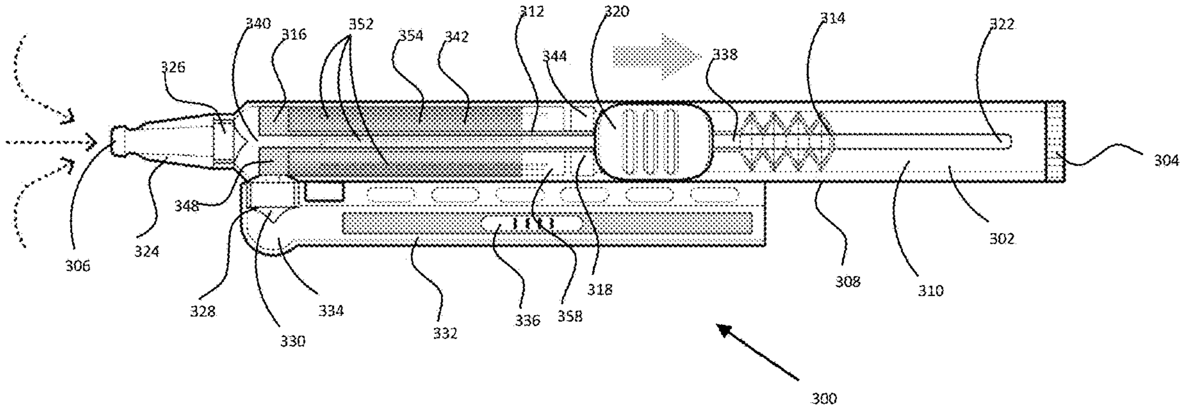
Figure 3C:
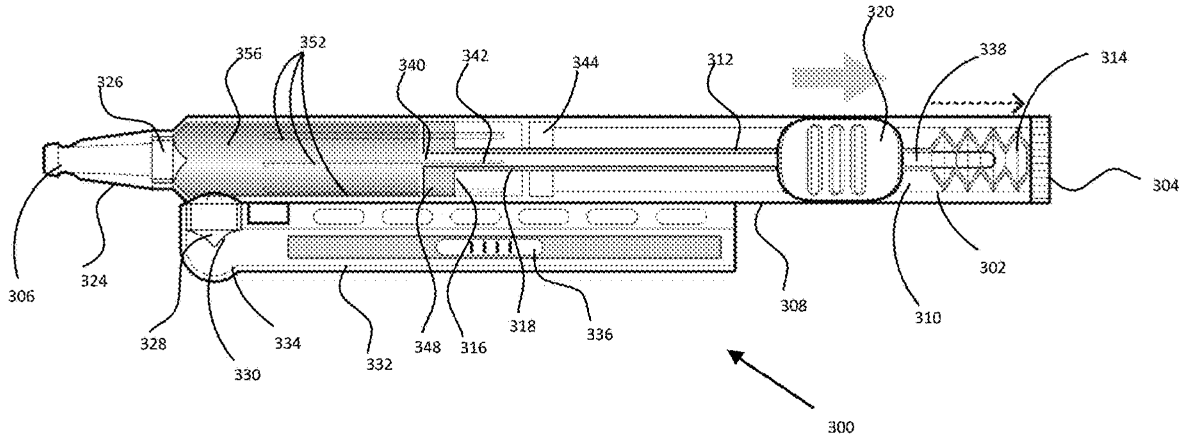
Figure 3D:
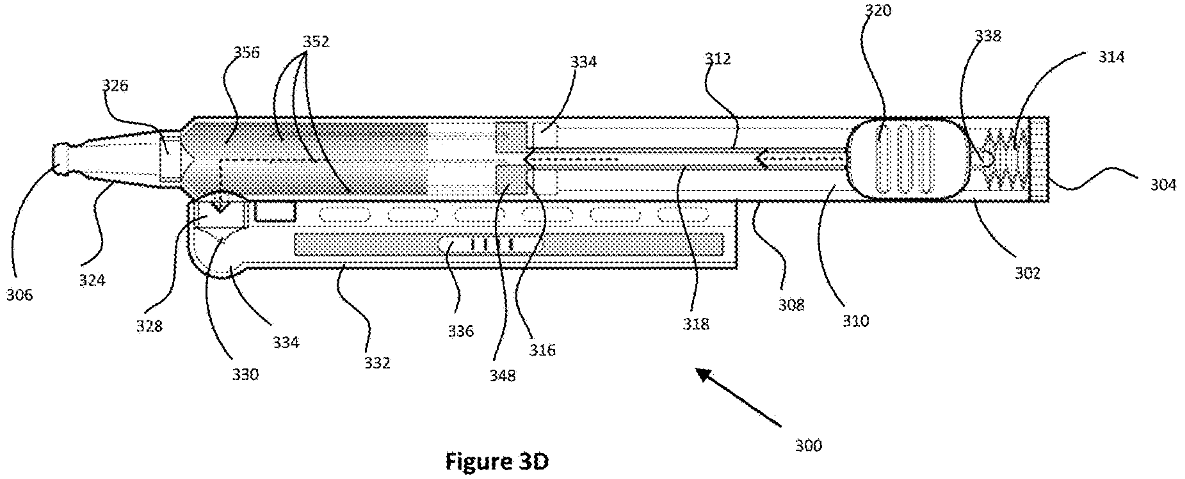

FIG. 3A illustrates assembly 300 in an initial state prior to commencement of the inspiration stroke. FIG. 3B illustrates assembly 300 during the inspiration stroke and prior to commencement of the expiration stroke. FIG. 3C illustrates assembly 300 during the expiration stroke. FIG. 3D illustrates assembly 300 subsequent to completion of the expiration stroke.

As shown in FIG. 3A, the initial state of assembly 300 (prior to commencement of the inspiration stroke) is a prefilled state in which a defined quantity of a prefilled fluid 354 (for example, a fluid or liquid buffer, diluent, reactant, reagent or any other fluid or liquid) is stored within a fluid chamber formed within lumen 310. As shown in FIG. 3A, the fluid chamber within which the prefilled liquid 354 is stored is a fluid chamber defined by the inner sidewall surfaces of lumen 310, resilient plunger head 348 at one end, and fluid tight seal 344 at the other end. It would be understood that the fluid tight seals formed by the resilient plunger head 348 at one end and by the fluid tight seal 344 at the other end prevents inadvertent leakage or escape of the prefilled fluid 354 from said fluid chamber.

As shown in FIG. 3A, in the initial state, in addition to the prefilled fluid 354, the fluid chamber defined by the inner sidewall surfaces of lumen 310, resilient plunger head 348 at one end, and fluid tight seal 344 additionally contains a certain quantity (or volume) of air (or other fluid) 358.

It will be particularly noted from FIG. 3A that in its initial state, the resilient plunger head 348 at one end and the fluid tight seal 344 at the other end are respectively positioned on either side of grooves or channels 352, such that said the entire body of grooves or channels 352 lie between the resilient plunger head 348 and fluid tight seal 344, which ensures that said grooves or channels 352 do not interfere with or impair the fluid tight seals formed at either end of the fluid chamber in which the prefilled fluid is stored. In a preferred embodiment, in its initial state illustrated in FIG. 3A, resilient plunger head 348 is positioned flush against or in abutment with nozzle 324.

FIG. 3B illustrates the inspiration stroke/inspiration action of assembly 300.

During operation of assembly 300, the nozzle 324 of assembly 300 (in its initial state as shown in FIG. 3A) may be dipped or inserted into a quantity of the assay sample that is sought to be assayed. Thereafter, as shown in FIG. 3B, an operator may commence moving reciprocable plunger assembly 312 (for example, by applying a pushing or pulling force on slider 320) in a direction from nozzle 324 towards closed first end 304. Movement of reciprocable plunger assembly 312 in a direction towards closed first end 304 of housing 302 results in piston head 316 and resilient plunger head 348 being moved away from nozzle 324 and in the direction of closed first end 304. Since resilient plunger head 348 is in fluid tight engagement with the internal sidewalls of lumen 310, withdrawing said resilient plunger head 348 in a direction away from nozzle 324 and towards closed first end 304 generates a vacuum or partial vacuum within lumen 310 both at, and proximal to, nozzle 324. Said vacuum or partial vacuum causes some part of the assay sample to be drawn into lumen 310 through open second end 306 and nozzle 324—into a portion of lumen 310 that is situated between nozzle 324 and resilient plunger head 348.

Simultaneously, the withdrawing of resilient plunger head 348 towards closed first end 304 causes resilient plunger head 348 to move toward fluid tight seal 344 thereby causing a contraction or shrinkage in the volume of the fluid chamber defined by the inner sidewall surfaces of lumen 310, resilient plunger head 348 at one end, and fluid tight seal 344. The contraction in volume of the fluid chamber causes an increase in pressure on the prefilled fluid that is housed in said fluid chamber. Further, as resilient plunger head 348 reaches a region of lumen 310 that has grooves or channels 352 formed on the internal sidewalls of said lumen 310, said grooves or channels provide one or more fluid passageways that permit prefilled fluid 354 to escape from the fluid chamber (defined by the inner sidewall surfaces of lumen 310, resilient plunger head 348 at one end, and fluid tight seal 344) and into the portion of lumen 310 between nozzle 324 and resilient plunger head 348. Since the prefilled fluid 354 is being transferred from a high-pressure region of lumen 310 (between resilient plunger head 348 and fluid tight seal 344) to a lower pressure region within lumen 310 (between resilient plunger head 348 and nozzle 324), the prefilled fluid 354 travels through said channels or grooves 352 in pressured jets or streams and mixes with the portion of the assay sample that has been drawn into lumen 310 through nozzle 324. The pressured streams cause the prefilled fluid 345 and assay sample to be agitated and satisfactorily mixed together—thereby forming a fluid-assay sample mix 356 within the portion of lumen 310 between nozzle 324 and resilient plunger head 348.

Withdrawal of resilient plunger head 348 in the direction of closed first end 304 may in an embodiment continue until resilient plunger head 348 or other portion of reciprocable plunger assembly 312 meets a positive stop or abutment surface that prevent further rearward travel. In an embodiment, this abutment surface is provided by fluid tight seal 344, wherein resilient plunger head 348 is withdrawn in the direction of closed first end 304 until it comes into contact with fluid tight seal 344. It would be understood that by withdrawing resilient plunger head 348 until it comes into contact with fluid tight seal 344 or other appropriately positioned positive stop during the inspiration stroke, it can be ensured that the entire volume of the prefilled liquid 354 is forced from a region of lumen 310 between the resilient plunger head 348 and the fluid tight seal 344 to a region of lumen 310 between nozzle 324 and resilient plunger head 348—for the purposes of mixing with the assay sample that has been drawing into lumen 310.

FIG. 3C illustrates the expiration stroke/expiration action of assembly 300. It will be noted that in the embodiment of FIG. 3C, the expiration stroke is a continuation of the action commenced in the inspiration stroke described above in connection with FIG. 3B. As shown in FIG. 3C, the expiration stroke of assembly 300 comprises continuing the movement of slider 320, and through slider 320, the movement of reciprocable plunger assembly 312, in the direction of closed first end 304. The movement is continued until compressible air reservoir 314 comes into contact with closed first end 304. Thereafter, further movement of reciprocable plunger assembly 312 in a direction towards closed first end 304 causes compressible air reservoir 312 to be progressively compressed or collapsed as a result of compression against closed first end 304—which in turn results in air or other fluid (that is held within the volume of compressible air reservoir 314) being driven out of compressible air reservoir 312, through lumen 342 and out of opening 340 formed on resilient plunger head 348—and into a region of lumen 310 that is between nozzle 324 and resilient plunger head 348.

As shown in FIG. 3D, the action of driving air or other fluid through lumen 342 and into a region of lumen 310 that is between nozzle 324 and resilient plunger head 348, has the effect of expelling a quantity of the fluid-assay sample mix (that is held in lumen 310 at a region between nozzle 324 and resilient plunger head 348) from lumen 310 and out of expiration outlet 328.

In an embodiment where expiration outlet 328 is positioned appropriately with respect to the region of an assaying assembly 332, the expiration stroke has the effect of driving a defined quantity of the fluid-assay sample mixture from within lumen 310 onto assaying assembly 332 through expiration outlet 328—whereafter the assaying assembly provides a visual or other indicator of a result of the fluidic assay. In a particular embodiment, the expiration outlet 332 is positioned such that the fluid-assay sample mixture 356 is delivered through expiration outlet 328 onto a sample-fluid receptacle (or delivery region) 334 provided within the assaying assembly—whereinafter the fluid-assay sample mixture causes one or more reactions within assaying assembly 332 to cause a visual or other indication through indicator 336 provided within assaying assembly 332.

It would be understood that the volume of fluid-assay sample mixture that is expelled from expiration outlet 328 is dependent on the volume of air that is driven out opening 340, and that by configuring the volume of air that is driven out of said aperture 340 (for example by controlling the volume of air stored within compressible air reservoir 314)

a precisely metered quantity of fluid-assay sample mixture 356 can be delivered from housing 302 onto assaying assembly 332.

FIGS. 4A to 4D illustrate a third embodiment of an assembly 400 for fluidic assaying in accordance with the teachings of the present invention.

Assembly 400 comprises a housing 402 comprising a closed first end 404 that is positioned proximal to a person operating assembly 400, an open second end 406 that is positioned distal to a person operating assembly 400 and a sidewall 408 connecting closed first end 404 and open second end 406 and forming a lumen 410 therebetween. Disposed within lumen 410 is a reciprocable plunger assembly 412 comprising an abutment surface 414 located proximal to the person operating assembly 400, a piston head 416 located distal to the person operating assembly 400, and a shaft 418 connecting said abutment surface 414 and piston head 416. Shaft 418 comprises a cannula having a lumen 442 therewithin. Disposed coaxially within lumen 442 in a slidingly fluid tight configuration is a part of shaft 446—wherein a first end of said shaft 446 that is proximal to closed first end 404, is coupled with slider 420, and a second end of said shaft 446 that is distal to closed first end 404 terminates in a plunger head 438 that is positioned coaxially within lumen 442.

Slider 420 is positioned outside of housing 402—wherein slider 420 is slidingly seated within a groove or channel 422 formed on sidewall 408 of housing 402, and is configured to be moved along said groove or channel 422 at least in the direction open second end 406, and optionally in the direction of closed first end 404. In the illustrated embodiment, slider 420 is connected to shaft 446 through a connector (not shown) formed on shaft 446. Movement of slider 420 is transmitted to shaft 446 and results in corresponding movement of plunger head 438 within lumen 442 in the same direction as slider 320.

Lumen 442 passes through piston head 416 and at one end forms an opening 440 on a resilient plunger head 448 that is disposed on piston head 416, such that a fluid passageway is formed between lumen 442 and the opening 440 on resilient plunger head 448. As a result, movement of compression of slider 420 in a direction from closed first end 404 towards open second end 406, is transmitted to shaft 446 and results in corresponding movement of plunger head 438 within lumen 442 in the direction of open second end 406—which in turn results in air or other fluid that is stored within lumen 442 being driven through lumen 442 and out of opening 440 that is formed on resilient plunger head 448.

In an embodiment, resilient plunger head 448 may be sized and positioned to form a fluid tight seal against the internal wall surfaces of lumen 410.

As illustrated in FIGS. 4A to 4D, housing 402 includes a fluid tight seal 444 formed within lumen 410 and positioned between nozzle 424 and closed first end 404. The fluid tight seal 444 may comprise a resilient stopper or any other sealing structure—and is immoveably affixed to the internal sidewalls of lumen 410. As illustrated, fluid tight seal 444 includes an aperture formed therein—which aperture permits shaft 418 of reciprocable plunger assembly 412 to pass therethrough. In particular, reciprocable plunger assembly 412 is configured such that shaft 418 passes through the aperture formed in fluid tight seal 444, while compressible air reservoir 414 and piston head 416 are positioned respectively on either side of said fluid tight seal 444. The aperture in fluid tight seal 444 and shaft 418 are respectively sized so as to permit reciprocating movement of shaft 418 through said aperture, in response to movement of slider 420 in a longitudinal direction between open second end 406 and closed first end 404. Additionally, fluid tight seal 444, the aperture therewithin and shaft 418 are respectively configured to ensure that despite the sliding arrangement, a fluid tight seal is also maintained between the external periphery of shaft 418 and the internal periphery of the aperture within fluid tight seal 444. As shown in each of FIGS. 4A to 4D, fluid tight seal 444 is disposed between piston head 416 on one end and abutment surface 414 on the other end—such that shaft 418 connecting piston head 416 and abutment surface 414 passes through the aperture formed within fluid tight seal 444.

Figure 4A:
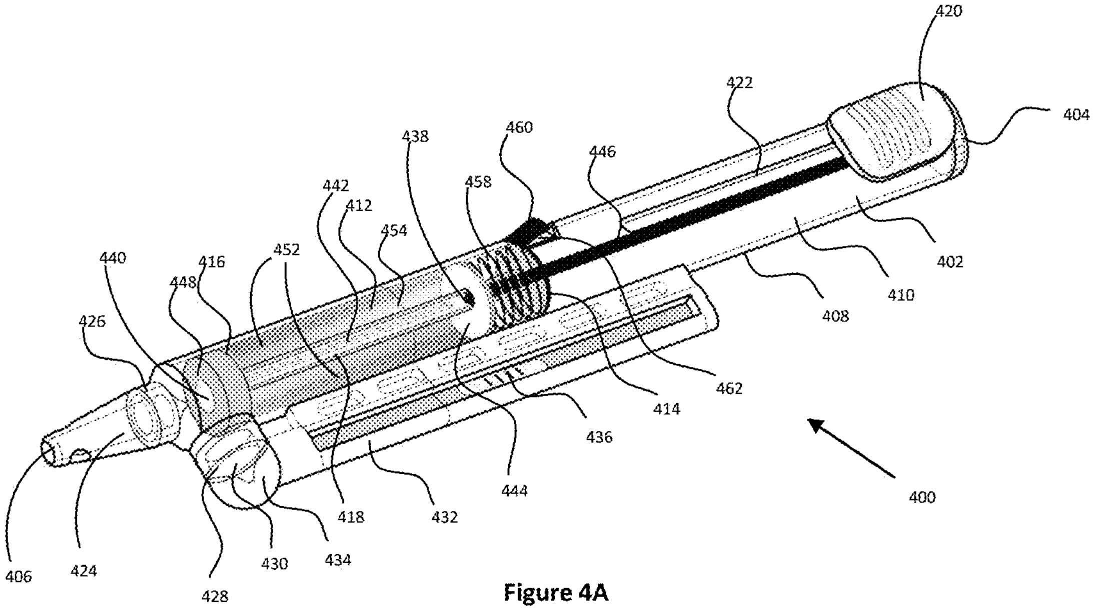
FIGS. 4A to 4D illustrate a third embodiment of an assembly for fluidic assaying in accordance with the teachings of the present invention.

Additionally, a resilient member 458 (such as a spring or member having shape memory properties) is disposed within lumen 410 between fluid tight seal 444 and abutment surface 414—wherein said resilient member 458 has a first end near or in contact with the proximal surface of fluid tight seal 444 and a second end that is near or in contact with the distal surface of abutment surface 414. In various embodiments of this description, the first end of resilient member 458 may be affixed to or coupled with fluid tight seal 444, or first end of resilient member 458 may be free from or uncoupled with fluid tight seal 444, and the second end of resilient member 458 may be affixed to or coupled with abutment surface 414, or second end of resilient member 458 may be free from or uncoupled with abutment surface 414. It shall be noted that these embodiment variations, with respect to the first and second ends of resilient member 458 and their relation with fluid tight seal 444 and abutment surface 414, may be present in any combination of near, in-contact, affixed, coupled, free, or uncoupled. The resilient member 458 is configured to conform to a compressed configuration when abutment surface 414 and fluid tight seal 444 are positioned in proximity to each other—thereby reducing the distance between the two, and forcing resilient member 458 into a compressed configuration. When abutment surface 414 is permitted to move away from fluid tight seal 444 towards closed first end 404, the resilient properties of resilient member 458 cause said resilient member to expand—thereby urging abutment surface away from fluid tight seal 444 and in the direction of closed first end 404. As shown in FIG. 4A, housing 402 may be provided with a locking arrangement that can be used to prevent abutment surface 414 from moving away from fluid tight seal 444, and thereby forcing resilient member 458 to retain its compressed configuration until the locking arrangement is manipulated to release abutment surface 414 so that it can move towards closed first end 404. In the embodiment illustrated in FIGS. 4A to 4D, the locking arrangement comprises a locking tab 460 having a first end affixed to abutment surface 414 within housing 402, and a second end that can be manipulated between a first configuration where the locking tab 460 is raised out of housing 402 through a corresponding recess 462 provided on a surface of housing 402, and a second configuration where the locking tab 460 lies entirely within lumen 410. It would be understood that when locking tab 460 is raised out of housing 402 through recess 462, movement of interconnected abutment surface 414 in the direction of closed first end 404 is prevented by interference between locking tab 460 and the perimeter of recess 462 that is provided on the surface of housing 402—which ensures that resilient member 458 remains in a compressed configuration caused by the proximity between abutment surface 414 and fluid tight seal 444. Once locking tab 460 is pushed entirely into lumen 410 through recess 462, no further interference is presented to movement of interconnected abutment surface 414 in the direction of closed first end 404—as a result of which resilient member 458 is permitted to assume an uncompressed configuration, which in turn urges abutment surface 414 in the direction of closed first end 404.

As illustrated in FIGS. 4A to 4D, open second end 406 of housing 402 may be formed as an inspiration nozzle 424 configured to permit inspiration of an assay sample from open second end 406 into housing 402. Inspiration nozzle 424 additionally includes a one-way valve 426 positioned between open second end 406 and lumen 410 of housing 402—which one way valve may be configured to permit for inspiration of an assay sample into lumen 410 while simultaneously preventing expiration of any solid or liquid matter from within lumen 410.

Housing 402 additionally includes an expiration outlet 428 configured to enable expiration of solid or liquid matter from lumen 410. Housing 402 also includes a one-way valve 430 positioned on or between expiration outlet 428 and lumen 410—which one way valve may be configured to permit for expiration of a fluid-assay sample mixture from within lumen 410 while preventing inspiration of any solid, liquid or fluid (which may be gaseous in nature, such as air) through expiration outlet 428. In an embodiment of the invention, expiration outlet 428 is configured to deliver a fluid-assay sample mixture 456 from within lumen 410 onto assaying assembly 432 that is configured to receive the fluid-assay sample mixture from expiration outlet 428 and to provide a visual or other indicator of a result of the fluidic assay. In a particular embodiment, the fluid-assay sample mixture 456 is delivered through expiration outlet 428 onto a sample-fluid receptacle (or delivery region) 434 provided within the assaying assembly 432—whereinafter the fluid-assay sample mixture 456 causes one or more reactions within assaying assembly 432 to cause a visual or other indication through indicator 436 provided within assaying assembly 432. In an embodiment, assaying assembly 432 may comprise any of an assay substrate, assay membrane, assay pad, assay chamber or assay well.

Internal wall surfaces of lumen 410 are provided with one or more mixing components configured to generate turbulence within one or more of the assay sample, the fluid intended for mixing with the assay sample, and the fluid-assay sample, for improving mixing of the fluid and assay sample. In an embodiment the one or more mixing components comprise grooves or channels 452 formed in a longitudinal direction on the internal wall surfaces of lumen 410. Said grooves or channels 452 may be formed by scoring or forming grooves on the internal wall surfaces of lumen 410 or alternatively by forming one or more raised ribs on the internal wall surfaces of lumen 410—which raised ribs would have the effect of forming channels or grooves 452 therebetween. Grooves or channels 452 are formed such that when resilient plunger head 448 is positioned at a portion of lumen 410 where said grooves or channels 452 have been formed at internal wall surfaces of lumen 410, said grooves or channels 452 form one or more fluid passageways around resilient plunger head 448, which fluid passageways permit fluid to pass from a region of the lumen 410 that is proximal to closed first end 404 to a region of the lumen 410 that is proximal to inspiration nozzle 424.

Further, grooves or channels 452 are formed at locations on the internal wall surfaces of lumen 410 such that in an initial state prior to inspiration of an assay sample through inspiration nozzle 424, when resilient plunger head 448 is positioned in a first position relatively proximal to (and preferably flush against) inspiration nozzle 424, resilient plunger head 448 is not in contact with said grooves or channels 452—and only comes into contact with said grooves or channels 452 as resilient plunger head 448 is withdrawn in the direction of closed first end 404 (in the manner discussed in more detail below) as part of the inspiration stroke of assembly 400.

As will be explained in detail below, the configuration of assembly 400 permits for an inspiration stroke wherein an assay sample is drawn into the assembly 400 and is simultaneously mixed with a pre-filled fluid stored within assembly 400, and for an expiration stroke, wherein a controlled amount of the fluid-assay sample mixture is expelled from the assembly 400 onto an assaying assembly for the purposes of generating a fluidic assay result. The operation of assembly 400 as well as the inspiration and expiration strokes are explained in more detail with reference to FIGS. 4A to 4D.

Figure 4B:
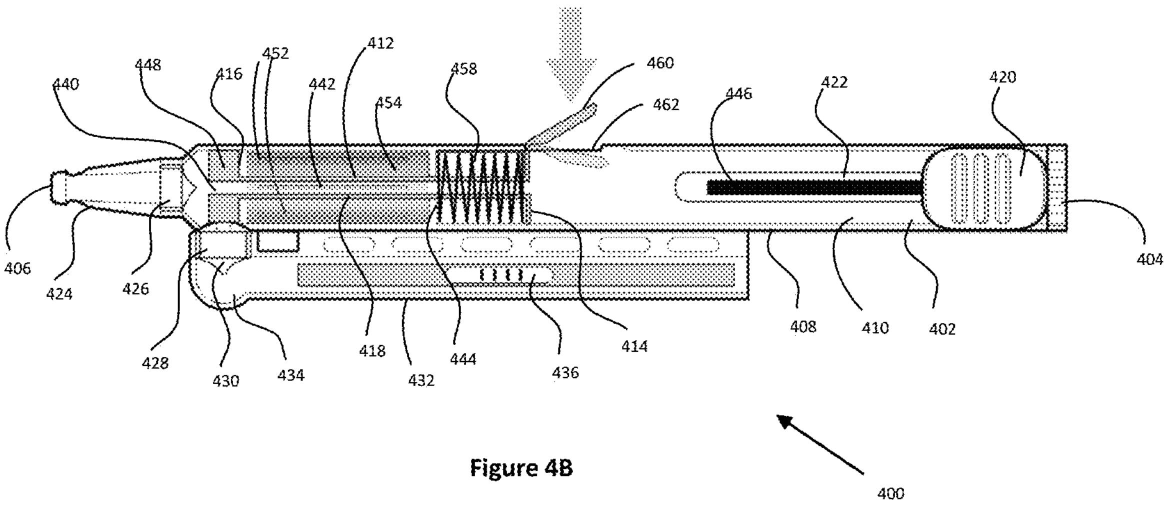
Figure 4C:
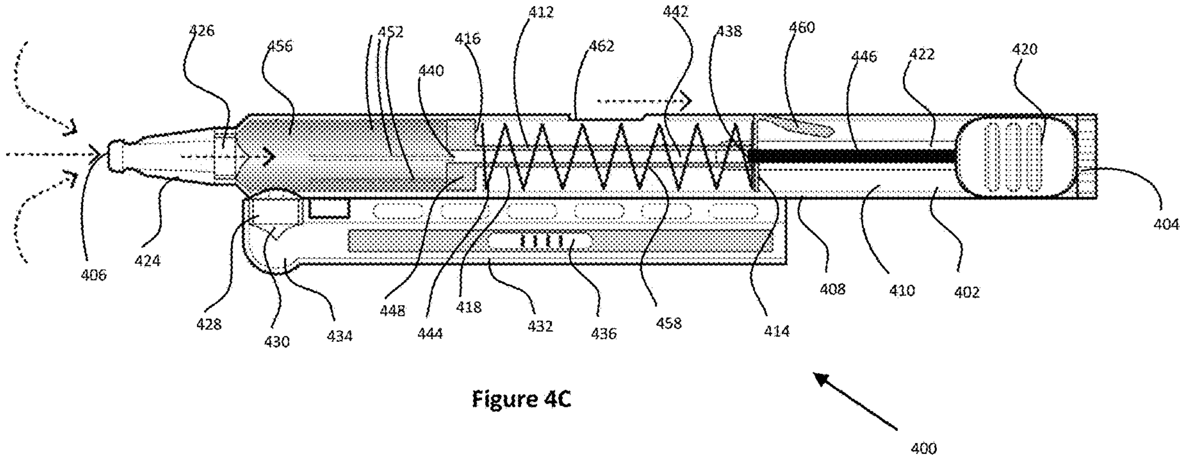
Figure 4D:
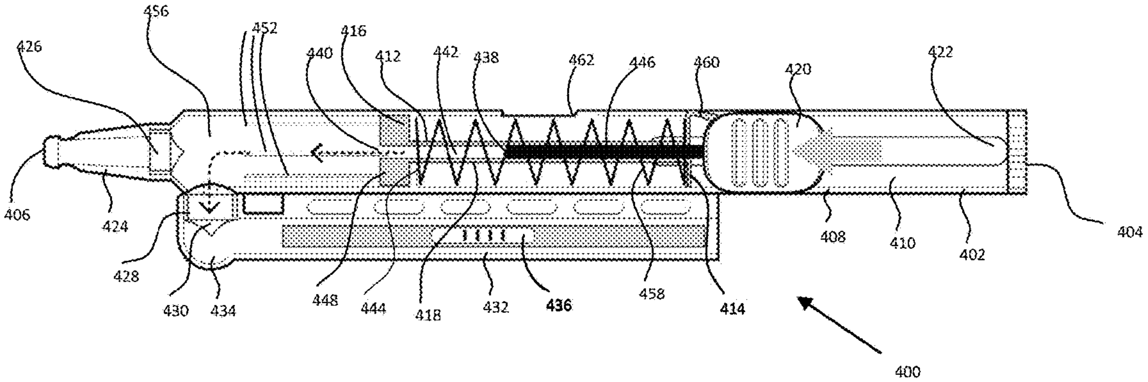

FIG. 4A illustrates assembly 400 in an initial state prior to commencement of the inspiration stroke. FIG. 4B illustrates the initiation of the inspiration stroke by pushing locking tab 460 through corresponding recess 462. FIG. 4C illustrates assembly 400 during the inspiration stroke and prior to commencement of the expiration stroke. FIG. 4D illustrates assembly 400 during the expiration stroke.

As shown in FIG. 4A, the initial state of assembly 400 (prior to commencement of the inspiration stroke) is a prefilled state in which a defined quantity of a prefilled fluid 454 (for example, a fluid or liquid buffer, diluent, reactant, reagent or any other fluid or liquid) is stored within a fluid chamber formed within lumen 410. As shown in FIG. 4A, the fluid chamber within which the prefilled liquid 454 is stored is a fluid chamber defined by the inner sidewall surfaces of lumen 410, resilient plunger head 448 at one end, and fluid tight seal 444 at the other end. It would be understood that the fluid tight seals formed by the resilient plunger head 448 at one end and by the fluid tight seal 444 at the other end prevents inadvertent leakage or escape of the prefilled fluid 454 from said fluid chamber.

It will be particularly noted from FIG. 4A that in its initial state, the resilient plunger head 448 at one end and the fluid tight seal 444 at the other end are respectively positioned on either side of grooves or channels 452, such that said the entire body of grooves or channels 452 lie between the resilient plunger head 448 and fluid tight seal 444, which ensures that said grooves or channels 452 do not interfere with or impair the fluid tight seals formed at either end of the fluid chamber in which the prefilled fluid is stored. In a preferred embodiment, in its initial state illustrated in FIG. 4A, resilient plunger head 448 is positioned flush against or in abutment with nozzle 424.

Yet further, in the initial state, resilient member 458 is forced into a compressed configuration by forcing abutment surface 414 and fluid tight seal 444 in proximity to each other and locking them in this position by manipulating locking tab 460 into a locked configuration During operation of assembly 400, the nozzle 424 of assembly 400 (in its initial state as shown in FIG. 4A) may be dipped or inserted into a quantity of the assay sample that is sought to be assayed. Thereafter, as shown in FIG. 4B, an operator may initiate the inspiration stroke by pushing locking tab 460 completely into lumen 410 through recess 462.

As shown in FIG. 4C, once abutment surface 414 is released from the locking action of locking tab 460, resilient member 458 progressively moves from its compressed configuration to an uncompressed configuration, thereby forcing abutment surface 414 away from fluid tight seal 444 and in the direction of closed first end 404. As a result of movement of abutment surface 414 in the direction of closed first end 404, the entire reciprocable plunger assembly 412, including interconnected shaft 418, and piston head 416 and resilient plunger head 448, is also drawn in in a direction from nozzle 424 towards closed first end 404.

Since resilient plunger head 448 is in fluid tight engagement with the internal sidewalls of lumen 410, withdrawing said resilient plunger head 448 in a direction away from nozzle 424 and towards closed first end 404 generates a vacuum or partial vacuum within lumen 410 both at, and proximal to, nozzle 424. Said vacuum or partial vacuum causes some part of the assay sample to be drawn into lumen 410 through open second end 406 and nozzle 424—into a portion of lumen 410 that is situated between nozzle 424 and resilient plunger head 448.

Simultaneously, the withdrawing of resilient plunger head 448 towards closed first end 404—causes resilient plunger head 448 to move toward fluid tight seal 444—thereby causing a contraction or shrinkage in the volume of the fluid chamber defined by the inner sidewall surfaces of lumen 410, resilient plunger head 448 at one end, and fluid tight seal 444. The contraction in volume of the fluid chamber causes an increase in pressure on the prefilled fluid that is housed in said fluid chamber. Further, as resilient plunger head 448 reaches a region of lumen 410 that has grooves or channels 452 formed on the internal sidewalls of said lumen 410, said grooves or channels provide one or more fluid passageways that permit prefilled fluid 454 to escape from the fluid chamber (defined by the inner sidewall surfaces of lumen 410, resilient plunger head 448 at one end, and fluid tight seal 444) and into the portion of lumen 410 between nozzle 424 and resilient plunger head 448. Since the prefilled fluid 454 is being transferred from a high-pressure region of lumen 410 (between resilient plunger head 448 and fluid tight seal 444) to a lower pressure region within lumen 410 (between resilient plunger head 448 and nozzle 424), the prefilled fluid 454 travels through said channels or grooves 452 in pressured jets or streams and mixes with the portion of the assay sample that has been drawn into lumen 410 through nozzle 424. The pressured streams cause the prefilled fluid 454 and assay sample to be agitated and satisfactorily mixed together—thereby forming a fluid-assay sample mix 456 within the portion of lumen 410 between nozzle 424 and resilient plunger head 448.

Withdrawal of resilient plunger head 448 in the direction of closed first end 404 may in an embodiment continue until resilient member 458 achieves its full uncompressed configuration or until any part of reciprocable plunger assembly 412 meets a positive stop or abutment surface that prevents further rearward travel.

FIG. 4D illustrates the expiration stroke/expiration action of assembly 400. It will be noted that in the embodiment of FIG. 4D, the expiration stroke is commenced by the operator moving slider 420 in a direction away from closed first end 404 towards nozzle 424. The movement imparted to slider 420 is transmitted through shaft 446 to plunger head 438 that is disposed coaxially within lumen 442 within reciprocable plunger assembly 412—causing said plunger head 438 to travel within lumen 442 in the direction of nozzle 424. As a result of such movement of plunger head 438 within lumen 442, air or other fluid (that is held within lumen 442) is driven out of lumen 442 from opening 440 formed on resilient plunger head 448—and into a region of lumen 410 that is between nozzle 424 and resilient plunger head 448.

As shown in FIG. 4D, the action of driving air or other fluid through lumen 442 and into a region of lumen 410 that is between nozzle 424 and resilient plunger head 448, has the effect of expelling a quantity of the fluid-assay sample mixture (that is held in lumen 410 at a region between nozzle 424 and resilient plunger head 448) from lumen 410 and out of expiration outlet 428.

It would be understood that the volume of a fluid-assay sample mixture that is expelled from expiration outlet 428 is dependent on the volume of air that is driven out opening 440, and that by configuring the volume of air that is driven out of said aperture 440 (for example by controlling the volume of air stored within lumen 442 or the distance that plunger head 428 is permitted to travel within lumen 442) a precisely metered quantity of fluid-assay sample mixture 456 can be delivered from housing 402 onto assaying assembly 432.

Figure 5A:
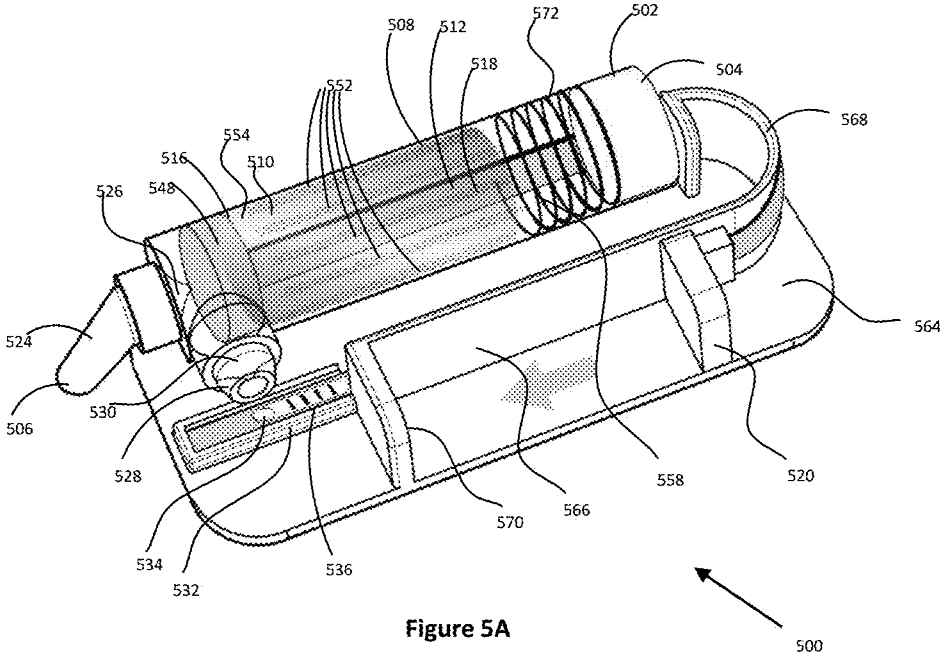
FIGS. 5A to 5C illustrate a fourth embodiment of an assembly for fluidic assaying in accordance with the teachings of the present invention.
Figure 5B:
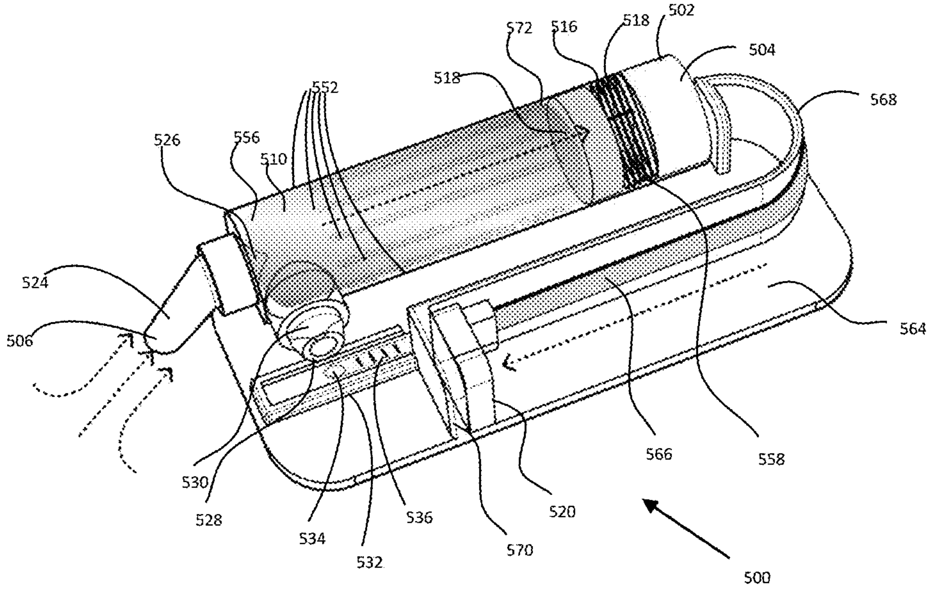
Figure 5C:
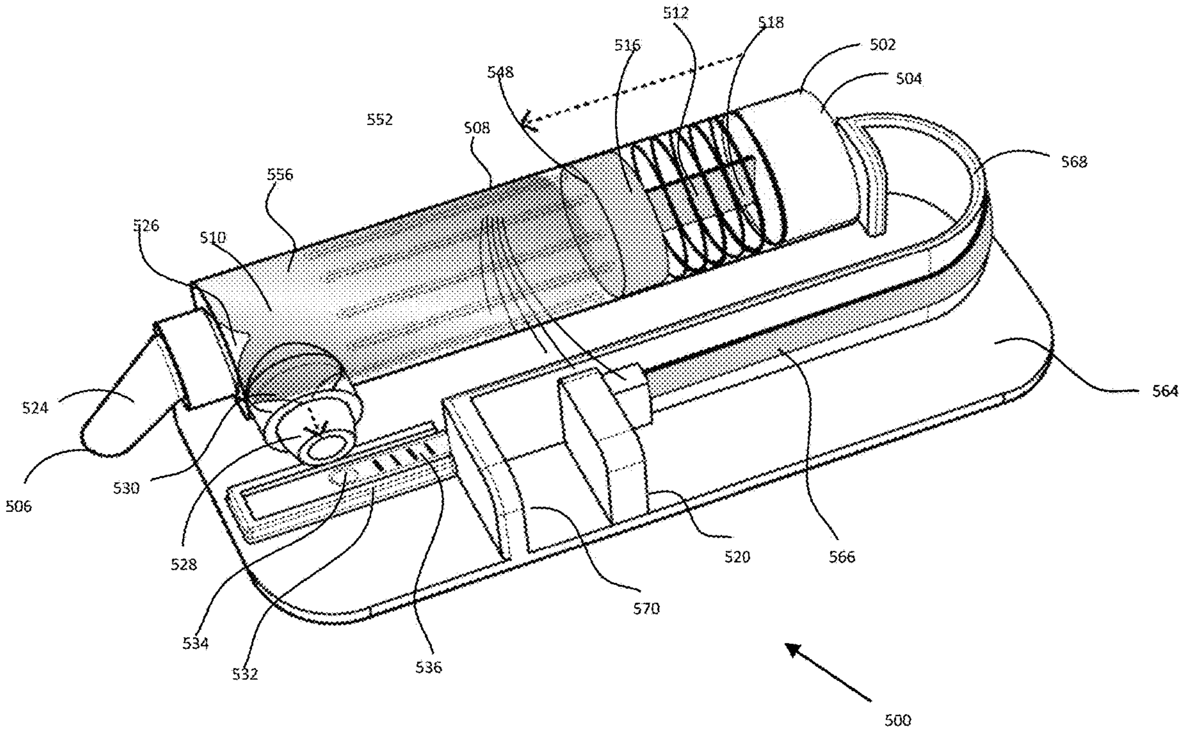

FIGS. 5A to 5C illustrate a fourth embodiment of an assembly 500 for fluidic assaying in accordance with the teachings of the present invention.

Assembly 500 comprises a housing 502 comprising a closed first end 504, an open second end 506, and a sidewall 508 connecting closed first end 504 and open second end 506 and forming a lumen 510 therebetween. Disposed within lumen 510 is a reciprocable plunger assembly 512 comprising a piston head 516, a slider 520 and a retraction shaft 518 that connects slider 520 with piston head 516. In an embodiment, retraction shaft is a flexible shaft (for example, a cable).

Slider 520 is positioned outside of housing 502—wherein slider 520 is configured to slide along a guidewall (or other guide structure) 566. Slider 520 may be configured to slide along guidewall 566 by being seated within a groove or channel (not shown) formed on guidewall 566 of housing 502, and is configured to be moved along said groove or channel. Slider 520, retraction shaft 518 and piston head 516 may be interconnected such that movement of slider 520 in a first direction results in piston head 516 being drawn by retraction shaft 518 in a direction away from open second end 506 and towards closed first end 504, while movement of slider 520 in a second direction results in piston head 516 moving away from closed first end 504 and towards open second end 506. Guidewall 566 may additionally be provided with a positive stop or abutment stop 570 that prevents movement of slider 520 beyond a particular point—thereby ensuring that retraction shaft 518 cannot be over-retracted or over-stressed by application of withdrawing force by an operator. In an embodiment, guidewall 566 may comprise one or more curves or bends 568 incorporated therein, which permits for a larger length of retraction shaft 518 to be arranged and manipulated within a compact region, thereby permitting increase in the travel distance of piston head 516 towards or away from closed first end 504 without having to substantially increase the size of the assembly 500. In a particular embodiment, housing 502, guidewall 566, slider 520 and abutment stop 570 may all be incorporated onto a base 564—which base 564 permits for mounting of assembly 500 on a desired object or surface.

As illustrated in FIG. 5A, retractable shaft 518 may be configured to pass through an aperture in closed first end 504 or other part of housing 502—such that one end of retractable shaft 518 can be connected to piston head 516 that is within housing 502, and the other end of retractable shaft 518 can be connected to slider 520 that is outside housing 502. It would be understood that the aperture may be sized, positioned and/or configured to form a fluid tight seal about the external circumference of retractable shaft 518, while at the same time permitting retractable shaft 518 to be retracted in the direction of slider 520 or pushed in the direction of open second end 506.

As illustrated in FIG. 5A, housing 502 includes a resilient member 558 (such as a spring or other member having shape memory properties) that is disposed within lumen 510 between piston head 516 and closed first end 504—wherein said resilient member 558 has a first end proximal to closed first end 504 and a second end that is distal to closed first end 504, and is immoveably affixed at the first end proximal to closed first end 504, while the second end that is distal to closed first end 504 is uncoupled. The resilient member 558 is configured to conform to a compressed configuration when piston head 516 and closed first end 504 are positioned in proximity to each other—thereby reducing the distance between the two, and forcing resilient member 558 into a compressed configuration. When piston head 516 is permitted to move away from closed first end 504 towards open second end 506, the resilient properties of resilient member 558 cause said resilient member to expand—thereby urging piston head 516 away from closed first end 504 and in the direction of open second end 506.

As illustrated in FIGS. 5A to 5C, open second end 506 of housing 502 may be formed as an inspiration nozzle 524 configured to permit inspiration of an assay sample from open second end 506 into housing 502. Inspiration nozzle 524 additionally includes a one-way valve 526 positioned between open second end 506 and lumen 510 of housing 502—which one way valve 526 may be configured to permit for inspiration of an assay sample into lumen 510 while simultaneously preventing expiration of any solid or liquid matter from within lumen 510.

Housing 502 additionally includes an expiration outlet 528 configured to enable expiration of solid or liquid matter from lumen 510. Housing 502 also includes a one-way valve 530 positioned on or between expiration outlet 528 and lumen 510—which one way valve may be configured to permit for expiration of a fluid-assay sample mixture from within lumen 510 while preventing inspiration of any solid, liquid or fluid (such as air) through expiration outlet 528. In an embodiment of the invention, expiration outlet 528 is configured to deliver a fluid-assay sample mixture 456 from within lumen 410 onto assaying assembly 432 that is configured to receive the fluid-assay sample mixture from expiration outlet 528 and to provide a visual or other indicator of a result of the fluidic assay. In a particular embodiment, the fluid-assay sample mixture 556 is delivered through expiration outlet 528 onto a sample-fluid receptacle (or delivery region) 534 provided within the assaying assembly 532—whereinafter the fluid-assay sample mixture 556 causes one or more reactions within assaying assembly 532 to cause a visual or other indication through indicator 536 provided within assaying assembly 532. In an embodiment, assaying assembly 532 may comprise any of an assay substrate, assay membrane, assay pad, assay chamber or assay well.

Internal wall surfaces of lumen 510 are provided with one or more mixing components configured to generate turbulence within one or more of the assay sample, the fluid intended for mixing with the assay sample, and the fluid-assay sample, for improving mixing of the fluid and assay sample. In an embodiment the one or more mixing components comprise grooves or channels 552 formed in a longitudinal direction on the internal wall surfaces of lumen 510. Said grooves or channels 552 may be formed by scoring or forming grooves on the internal wall surfaces of lumen 510 or alternatively by forming one or more raised ribs on the internal wall surfaces of lumen 510—which raised ribs would have the effect of forming channels or grooves 552 therebetween. Grooves or channels 552 are formed such that when resilient plunger head 548 is positioned at a portion of lumen 510 where said grooves or channels 552 have been formed at internal wall surfaces of lumen 510, said grooves or channels 552 form one or more fluid passageways around resilient plunger head 548, which fluid passageways permit fluid to pass from a region of the lumen 510 that is proximal to closed first end 504 to a region of the lumen 510 that is proximal to inspiration nozzle 524.

Further, grooves or channels 552 are formed at locations on the internal wall surfaces of lumen 510 such that in an initial state prior to inspiration of an assay sample through inspiration nozzle 524, when resilient plunger head 548 is positioned in a first position relatively proximal to (and preferably flush against) inspiration nozzle 524, resilient plunger head 548 is not in contact with said grooves or channels 552—and only comes into contact with said grooves or channels 452 as resilient plunger head 548 is withdrawn in the direction of closed first end 504 (in the manner discussed in more detail below) as part of the inspiration stroke of assembly 500.

As will be explained in detail below, the configuration of assembly 500 permits for an inspiration stroke wherein an assay sample is drawn into the assembly 500 and is simultaneously mixed with a pre-filled fluid stored within assembly 500, and for an expiration stroke, wherein a controlled amount of the fluid-assay sample mixture is expelled from the assembly 500 onto an assaying assembly for the purposes of generating a fluidic assay result. The operation of assembly 500 as well as the inspiration and expiration strokes are explained in more detail with reference to FIGS. 5A to 5C.

FIG. 5A illustrates assembly 500 in an initial state prior to commencement of the inspiration stroke. FIG. 5B illustrates assembly 500 during the inspiration stroke and prior to commencement of the expiration stroke. FIG. 4C illustrates assembly 400 during the expiration stroke.

As shown in FIG. 5A, the initial state of assembly 500 (prior to commencement of the inspiration stroke) is a prefilled state in which a defined quantity of a prefilled fluid 554 (for example, a fluid or liquid buffer, diluent, reactant, reagent or any other fluid or liquid) is stored within a fluid chamber formed within lumen 510. As shown in FIG. 5A, the fluid chamber within which the prefilled liquid 554 is stored is a fluid chamber defined by the inner sidewall surfaces of lumen 510, resilient plunger head 548 at one end, and closed first end 504 at the other end. It would be understood that the fluid tight seals formed by the resilient plunger head 548 at one end and by the closed first end 504 at the other end prevent inadvertent leakage or escape of the prefilled fluid 554 from said fluid chamber.

As shown in FIG. 5A, in the initial state, in addition to the prefilled fluid 554, the fluid chamber defined by the inner sidewall surfaces of lumen 510, resilient plunger head 548 at one end, and closed first end 504 additionally contains a certain quantity (or volume) of air (or other fluid) 572.

It will be particularly noted from FIG. 5A that in its initial state, the resilient plunger head 548 at one end and the closed first end 504 at the other end of housing 502 are respectively positioned on either side of grooves or channels 552, such that said the entire body of grooves or channels 552 lie between the resilient plunger head 548 and closed first end 504, which ensures that said grooves or channels 552 do not interfere with or impair the fluid tight seals formed by the resilient plunger head 548 for the fluid chamber in which the prefilled fluid is stored. In a preferred embodiment, in its initial state illustrated in FIG. 5A, resilient plunger head 548 is positioned flush against or in abutment with nozzle 524.

During operation of assembly 500, the nozzle 524 of assembly 500 (in its initial state as shown in FIG. 5A) may be dipped or inserted into a quantity of the assay sample that is sought to be assayed. Thereafter, as shown in FIG. 5B, an operator may initiate the inspiration stroke by pulling or pushing slider 520 towards abutment stop 570.

As shown in FIG. 5B, as slider 520 is moved towards abutment stop 570, it causes retraction of shaft 518—which in turn causes the end of retraction shaft 518 that is affixed to piston head 516 to draw piston head 516 in a direction from nozzle 524 towards closed first end 504. As piston head 516 is drawn progressively closer to closed first end 504, resilient member 558 progressively moves from its uncompressed configuration to a compressed configuration.

Since resilient plunger head 548 is in fluid tight engagement with the internal sidewalls of lumen 510, withdrawing piston head 516 (and consequently, resilient plunger head 548 that is mounted on or affixed to piston head 516) in a direction away from nozzle 524 and towards closed first end 504 generates a vacuum or partial vacuum within lumen 510 both at, and proximal to, nozzle 524. Said vacuum or partial vacuum causes some part of the assay sample to be drawn into lumen 510 through open second end 506 and nozzle 524—into a portion of lumen 510 that is situated between nozzle 524 and resilient plunger head 548.

Simultaneously, the withdrawing of piston head 516 and resilient plunger head 548 towards closed first end 504—causing resilient plunger head 548 to move toward closed first end 504—thereby causes a contraction or shrinkage in the volume of the fluid chamber defined by the inner sidewall surfaces of lumen 510, resilient plunger head 548 at one end, and closed first end 504. The contraction in volume of the fluid chamber causes an increase in pressure on the prefilled fluid that is housed in said fluid chamber. Further, as resilient plunger head 548 reaches a region of lumen 510 that has grooves or channels 452 formed on the internal sidewalls of said lumen 510, said grooves or channels provide one or more fluid passageways that permit prefilled fluid 554 to escape from the fluid chamber (defined by the inner sidewall surfaces of lumen 510, resilient plunger head 548 at one end, and closed first end 504) and into the portion of lumen 510 between nozzle 524 and resilient plunger head 548. Since the prefilled fluid 554 is being transferred from a high-pressure region of lumen 510 (between resilient plunger head 548 and closed first end 504) to a lower pressure region within lumen 510 (between resilient plunger head 548 and nozzle 524), the prefilled fluid 554 travels through said channels or grooves 552 in pressured jets or streams and mixes with the portion of the assay sample that has been drawn into lumen 510 through nozzle 524. The pressured streams cause the prefilled fluid 554 and assay sample to be agitated and satisfactorily mixed together—thereby forming a fluid-assay sample mix 556 within the portion of lumen 510 between nozzle 524 and resilient plunger head 448.

Withdrawal of resilient plunger head 548 in the direction of closed first end 504 may in an embodiment continue until resilient member 558 achieves its full compressed configuration or until slider 520 meets abutment stop 570 that prevents rearward travel of resilient plunger head 548 in the direction of closed first end 504.

FIG. 5C illustrates the expiration stroke/expiration action of assembly 500. It will be noted that in the embodiment of FIG. 5C, the expiration stroke is commenced by the operator releasing slider 520. Release of slider 520 has the effect of terminating the withdrawing force applied to piston head 516 in the direction of closed first end 504, thereby freeing piston head 516 and resilient plunger head 548 to move back towards nozzle 524. Simultaneously, upon termination of said withdrawing force, the compressive force applied to resilient member 558 by piston head 516 is also terminated—causing resilient member 558 to progressively regain its expanded or uncompressed configuration. The expansion of said resilient member 558 results in a force being applied by the expanding resilient member 558 on piston head 516 and/or resilient plunger head 548 in a direction from closed first end 504 towards nozzle 524—causing resilient plunger head 548 to travel within lumen 510 in the direction of nozzle 524. Such movement of plunger head 548 within lumen 510 towards nozzle 424 has the effect of expelling a quantity of the fluid-assay sample mixture (that is held in lumen 510 at a region between nozzle 424 and resilient plunger head 548) from lumen 510 and out of expiration outlet 528.

It would be understood that the volume of fluid-assay sample mixture that is expelled from expiration outlet 528 is dependent on range of movement of resilient plunger head 548 within lumen 410 in the direction of nozzle 424, and that by configuring the range of movement (for example by appropriately selecting the size and resilient properties of resilient member 558, or the distance that plunger head 548 is permitted to travel within lumen 510) a precisely metered quantity of the fluid-assay sample mixture 556 can be delivered from housing 502 onto assaying assembly 532.

FIGS. 6A to 6D illustrate a fifth embodiment of an assembly for fluidic assaying in accordance with the teachings of the present invention.

Assembly 600 comprises a substantially cylindrical fluid chamber 602 having an open first end 6022, an open second end 6024 and sidewall(s) 6028 connecting said open first end 6022 and open second end 6024—forming a lumen 6034 therebetween. Open second end 6024 comprises an inlet nozzle, and may have a suction component 6026 affixed thereto, said suction component having a suction cup inlet end 6036 and a nozzle shaped outlet end 6038—and a fluid passageway defined therebetween. Nozzle shaped outlet end 6038 is disposed within the inlet nozzle of open second end 6024 of fluid chamber 602—such that solid or liquid matter entering suction cup inlet end 6036 of suction component 6026 may be drawn through nozzle shaped outlet end 6038, through open second end 6024 and into fluid chamber 602. Suction component 6026 may be formed of a pliant material that has resilient properties which permits generation of suction by application of pressure in a direction from outlet shaped nozzle 6038 towards suction cup inlet end 6036.

Fluid chamber 602 may additionally have a one-way valve 6054 positioned within the inlet nozzle of open second end 6024 between nozzle shaped outlet end 6038 and open first end 6022 of said fluid chamber 602—which valve permits for material to be drawn into fluid chamber 602 through open second end 6024 but which prevents material from being expelled through open second end 6024.

Assembly 600 additionally includes a plunger assembly 604 comprising a plunger shaft 6046 having a first end 6042 and a second end comprising plunger head 6044. A portion of plunger shaft 6046 is disposed coaxially within open first end 6022 of fluid chamber 602, such that plunger head 6044 is housed within fluid chamber 602. Plunger head 6044 may be sized so as to fit slidingly against the internal sidewall(s) of fluid chamber 602, in a manner such that motion imparted to plunger shaft 6046 in a direction from open first end 6022 towards open second end 6024 results in movement of plunger head 6044 within fluid chamber 602 in the same direction, and motion imparted to plunger shaft 6046 in a direction from open second end 6024 towards open first end 6022 results in movement of plunger head 6044 within fluid chamber 602 in the same direction.

Fluid chamber 602 additionally has a fluid tight seal 6032 disposed at open first end 6022 of fluid chamber 602, which may comprise a resilient stopper or any other sealing structure—and is immoveably affixed to the internal sidewalls that form open first end 6022. As illustrated, fluid tight seal 6032 includes an aperture formed therein—which aperture permits plunger shaft 6046 to pass therethrough. In particular, plunger assembly 604 is configured such that plunger shaft 6046 passes through the aperture formed in fluid tight seal 6032, while plunger head 6044 is positioned between said fluid tight seal 6032 and open second end 6024. The aperture in fluid tight seal 6032 and plunger shaft 6046 are respectively sized so as to permit reciprocating movement of plunger shaft 6046 through said aperture, in response to movement of plunger shaft 6046 in a longitudinal direction from open first end 6022 towards open second end 6024 or in the reverse direction. Additionally, fluid tight seal 6032, the aperture therewithin and plunger shaft 6046 are respectively configured to ensure that despite the sliding arrangement, a fluid tight seal is also maintained between the external periphery of plunger shaft 6046 and the internal periphery of the aperture within fluid tight seal 6032.

Plunger head 6044 includes one or more mixing components configured to generate turbulence within one or more of the assay sample, the fluid intended for mixing with the assay sample, and the fluid-assay sample, for improving mixing of the fluid and assay sample. In an embodiment the one or more mixing components comprise one or more channels 6052 provided within plunger head 6044, which one or more channels 6052 provide one or more constricted fluid passageways between the open first end 6022 and the open second end 6024 of fluid chamber 602 across plunger head 6044. In one embodiment one or more of said channels may additionally provide one or more fluid passageways from a face of plunger head 6044 that faces second open end 6024 through the body of plunger shaft 6046 and out of one or more fluid outlets provided on the body of plunger shaft 6046.

Figure 6A:
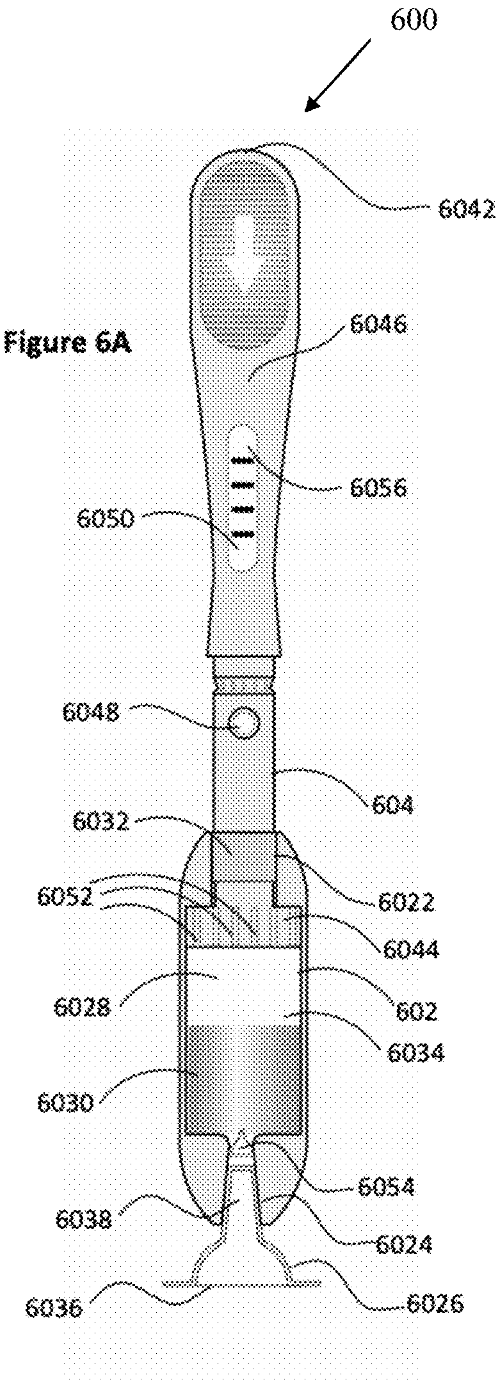
FIGS. 6A to 6D illustrate a fifth embodiment of an assembly for fluidic assaying in accordance with the teachings of the present invention.

As shown in FIG. 6A, the initial state of assembly 600 (prior to commencement of the inspiration stroke) is a prefilled state in which a defined quantity of a prefilled fluid 6030 (for example, a fluid or liquid buffer, diluent, reactant, reagent or any other fluid or liquid) is stored within fluid chamber 602. As shown in FIG. 6A, the prefilled fluid chamber within which the prefilled liquid 6030 is stored in a fluid space defined by the inner sidewall(s) 6028 of fluid chamber 602, plunger head 6044 at one end, and valve 6054 disposed within open second end 6024 It would be understood that the fluid tight seal 6032 formed about plunger shaft 6046 at open first end 6022 of fluid chamber 602 prevents inadvertent leakage or escape of the prefilled fluid 6030 from said fluid chamber 602.

Plunger assembly 604 additionally incorporates within plunger shaft 6046 an assaying assembly 6056 that is configured to receive the fluid-assay sample mix and to provide a visual or other indicator of a result of the fluidic assay. In a particular embodiment, the fluid-assay sample mixture is delivered onto a sample-fluid receptacle (or delivery region) 6048 provided within the assaying assembly 6056—whereinafter the fluid-assay sample mixture causes one or more reactions within assaying assembly 6056 to cause a visual or other indication through indicator 6050 provided within assaying assembly 6056. In an embodiment, assaying assembly 6056 may comprise any of an assay substrate, assay membrane, assay pad, assay chamber or assay well. In a particular embodiment of the assembly 600, sample fluid receptacle 6048 is located on a portion of plunger shaft 6046 that is between indicator 6050 and plunger head 6044.

As will be explained in detail below, the configuration of assembly 600 permits for an inspiration stroke wherein an assay sample is drawn into the assembly 600 and is simultaneously mixed with a pre-filled fluid stored within assembly 600, and for an expiration stroke, wherein a controlled amount of the fluid-assay sample mixture is expelled from the assembly 600 onto an assaying assembly for the purposes of generating a fluidic assay result. The operation of assembly 600 as well as the inspiration and expiration strokes are explained in more detail with reference to FIGS. 6A to 6D.

Figure 6B:
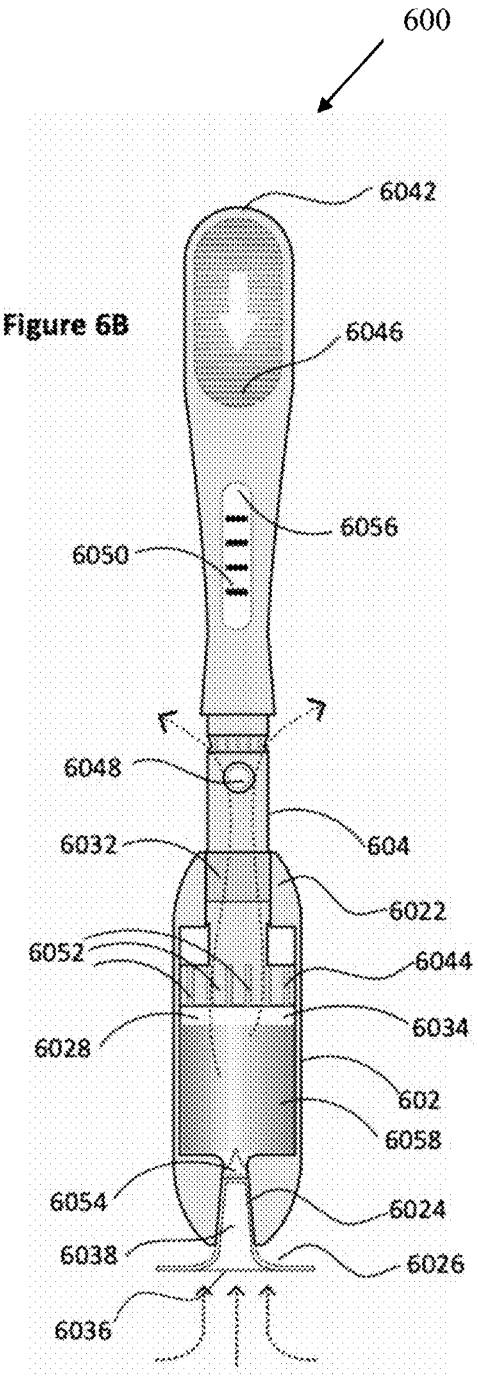
Figure 6C:
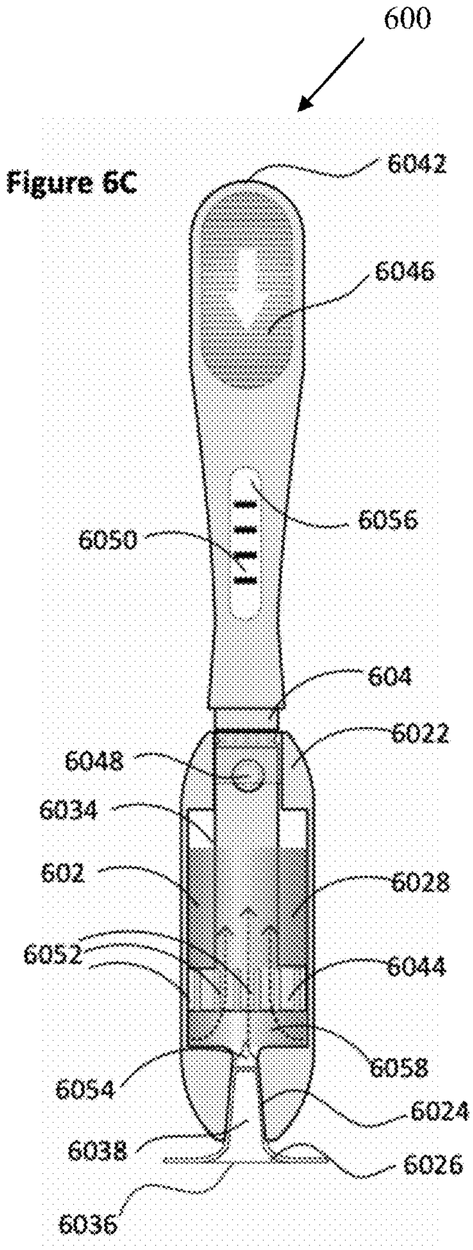
Figure 6D:
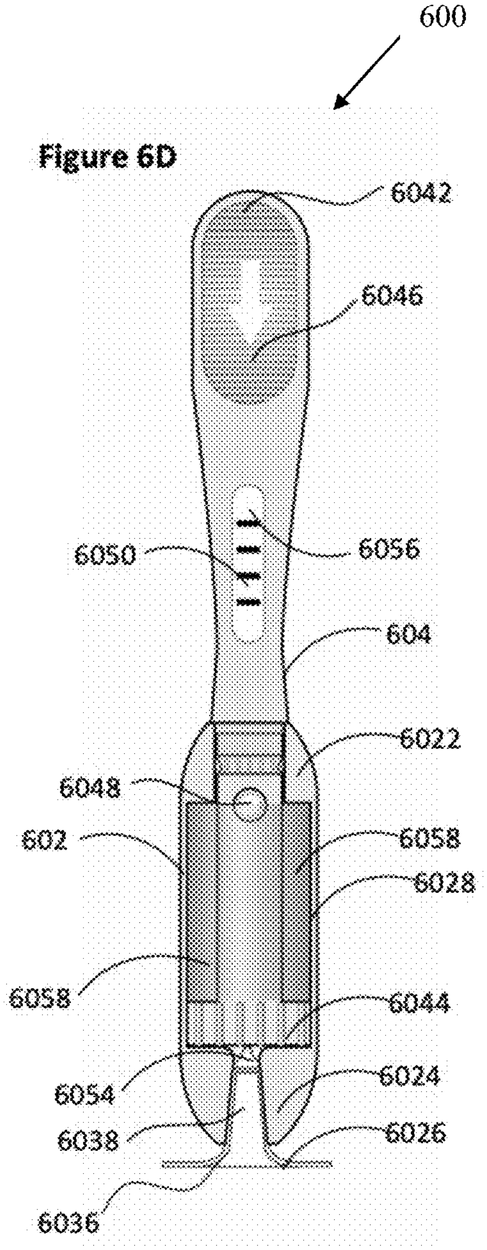

FIG. 6A illustrates assembly 600 in an initial state prior to commencement of the inspiration stroke. FIG. 6B illustrates assembly 600 during the inspiration stroke and prior to commencement of the expiration stroke. FIG. 6C illustrates assembly 600 during the expiration stroke. FIG. 6D illustrates assembly 600 subsequent to completion of the expiration stroke.

As shown in FIG. 6A, the initial state of assembly 600 (prior to commencement of the inspiration stroke) is a prefilled state in which a defined quantity of a prefilled fluid 6030 (for example, a fluid or liquid buffer, diluent, reactant, reagent or any other fluid or liquid) is stored within a fluid chamber formed within lumen 6034. As shown in FIG. 6A, the lumen 6034 within which the prefilled liquid 6030 is stored is a lumen within fluid chamber 602 that is defined by the inner surfaces of sidewall(s) 6028 of fluid chamber, plunger head 6044 at one end, and valve 6054 at the other end. It would be understood that the fluid tight seals formed by the valve 6054 at one end and by the fluid tight seal 6032 at the other end prevents inadvertent leakage or escape of the prefilled fluid 6030 from said fluid chamber.

As shown in FIG. 6A, in the initial state, in addition to the prefilled fluid 6030, the fluid chamber 602 additionally contains a certain quantity (or volume) of air (or other fluid).

It will be particularly noted from FIG. 6A that in its initial state, a certain volume of air or other fluid is disposed between prefilled liquid 6030 and plunger head 6044 and that plunger head 6044 is located proximal to open first end 6022 of fluid chamber 602 and distal to open second end 6024 of fluid chamber 602.

FIG. 6B illustrates the inspiration stroke/inspiration action of assembly 600.

During operation of assembly 600, suction component 6026 is placed or dipped into an assay sample—and plunger shaft 6046 may be moved or depressed in a direction towards open second end 6024 of fluid chamber 602—resulting in corresponding movement of plunger head 6044 towards open second end 6024. The downward force applied through plunger shaft 6046 causes suction component 6026 to collapse, thereby forcing such portion of the assay sample that is disposed within the suction cup inlet end 6036 to be forced upward through nozzle shaped outlet end 6038, through the inlet nozzle of open second end 6024 of fluid chamber 602, and through valve 6054, into fluid chamber 602—where the portion of the assay-sample that has been inspired mixes with the prefilled fluid 6030 within fluid chamber 602.

As shown in FIG. 6B, continued downward motion of plunger shaft 6046 causes plunger head 6044 to move progressively closer to the fluid-assay sample mixture 6058, while air or other fluid within the fluid chamber exits the chamber through the one or more channels 6052 provided within plunger head 6044 (and may escape out through one or more interconnected fluid outlets that are provided within the body of plunger shaft 6046).

As shown in FIG. 6C, further downward motion of plunger shaft 6046 forces plunger head 6044 into the fluid-assay sample mix 6058 that is now within fluid chamber 602, and the fluid-assay sample mix 6058 is forced through channels 6052 within plunger head 6044—thereby forcing the fluid-assay sample mixture 6058 to travel from a first region of the fluid chamber that is located between plunger head 6044 and valve 6054 to a second region of the fluid chamber that is located between plunger head 6044 and fluid tight seal 6032. The passage of the fluid-assay sample mixture 6058 through the constricted fluid passageways of channels 6052 agitates the mix and improves the mixing of the assay sample and the prefilled fluid.

As shown in FIG. 6D, further downward motion of plunger shaft 6046 forces plunger head 6044 yet closer to valve 6054, until sample-fluid receptacle 6048 that is positioned on plunger shaft 6046 is located within the fluid-assay sample mixture 6058 that is now positioned between plunger head 6044 and fluid tight seal 6032. Thereafter, the fluid-assay sample mixture 6058 causes one or more reactions within assaying assembly 6056 to cause a visual or other indication through indicator 6050 provided within assaying assembly 6056.

Figure 7A:
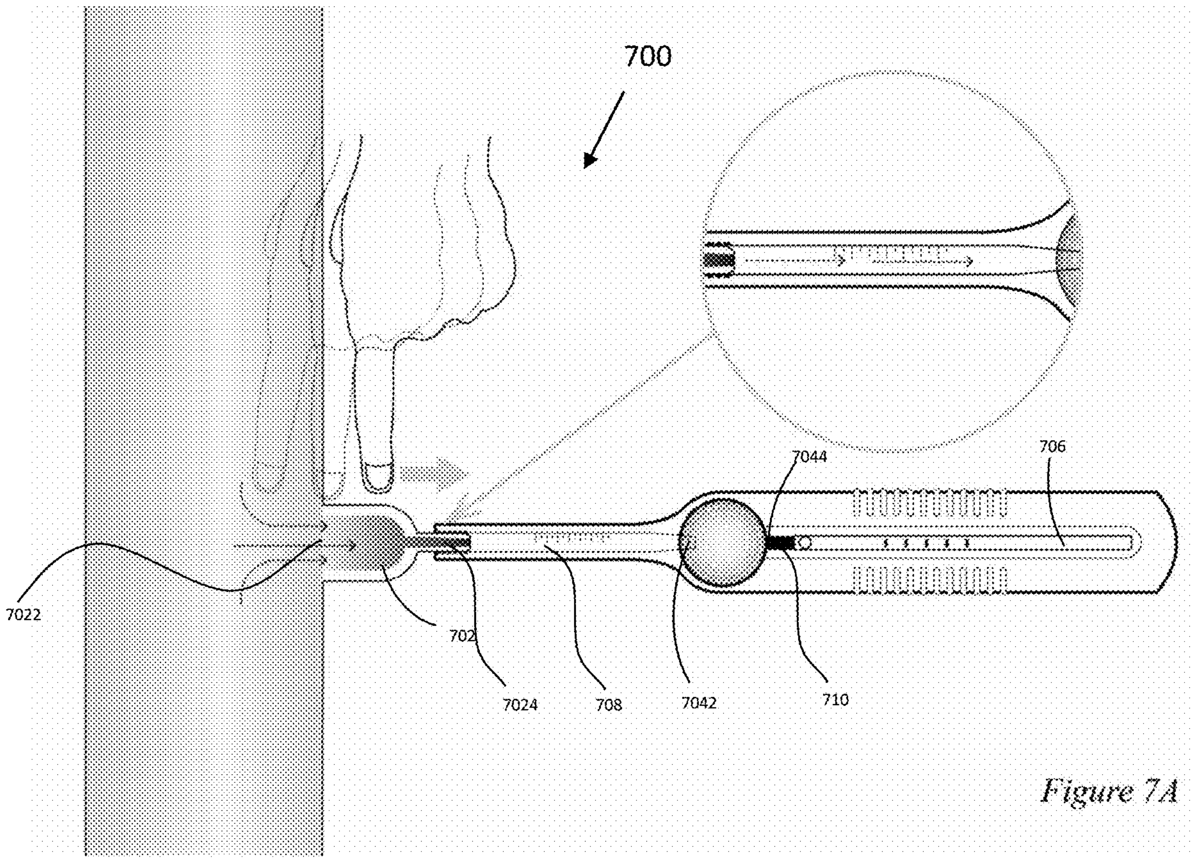
FIGS. 7A and 7B illustrate a sixth embodiment of an assembly for fluidic assaying in accordance with the teachings of the present invention.
Figure 7B:
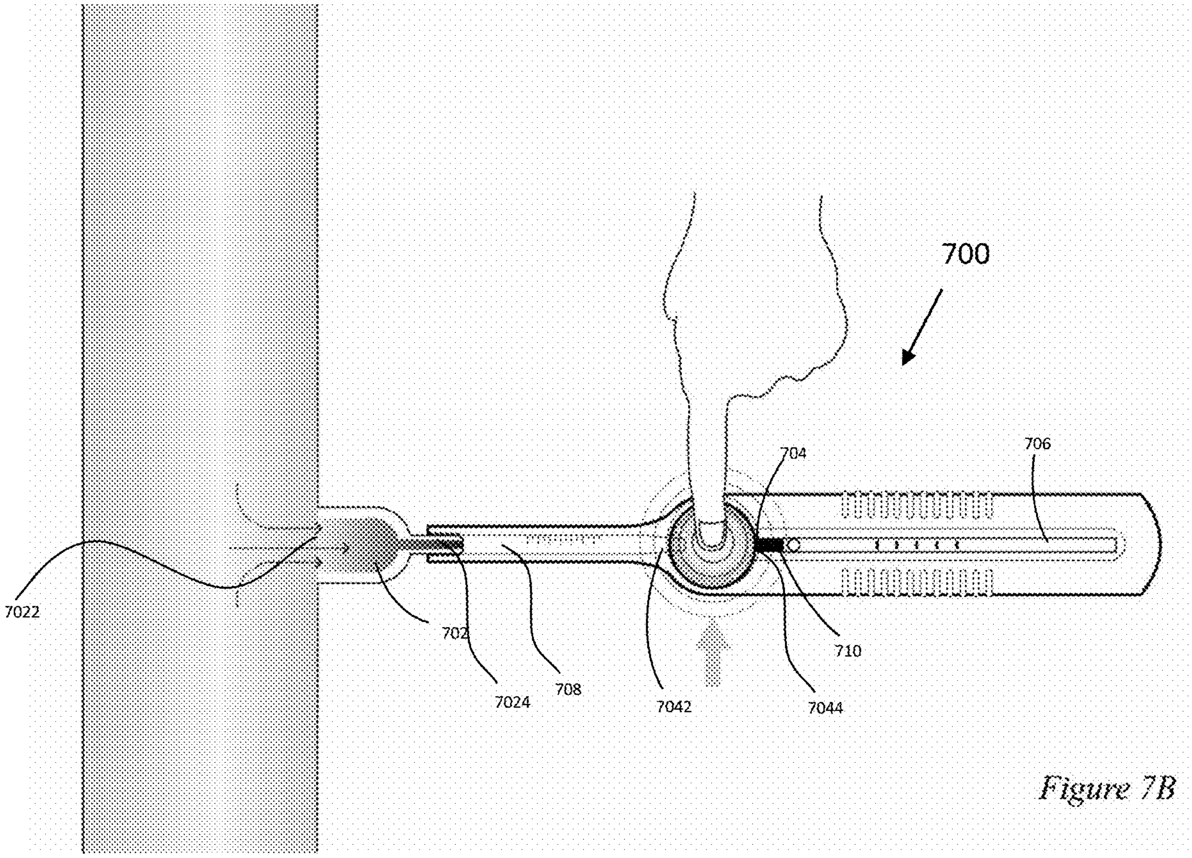
Figure 8A:
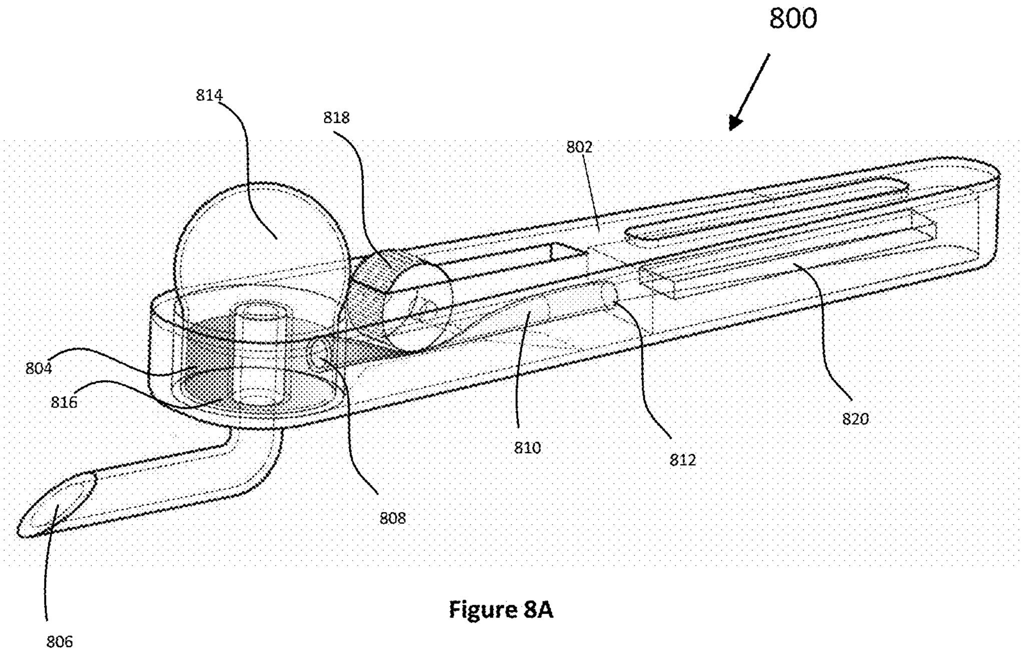
FIGS. 8A to 8D illustrate a seventh embodiment of an assembly for fluidic assaying in accordance with the teachings of the present invention.
Figure 8B:
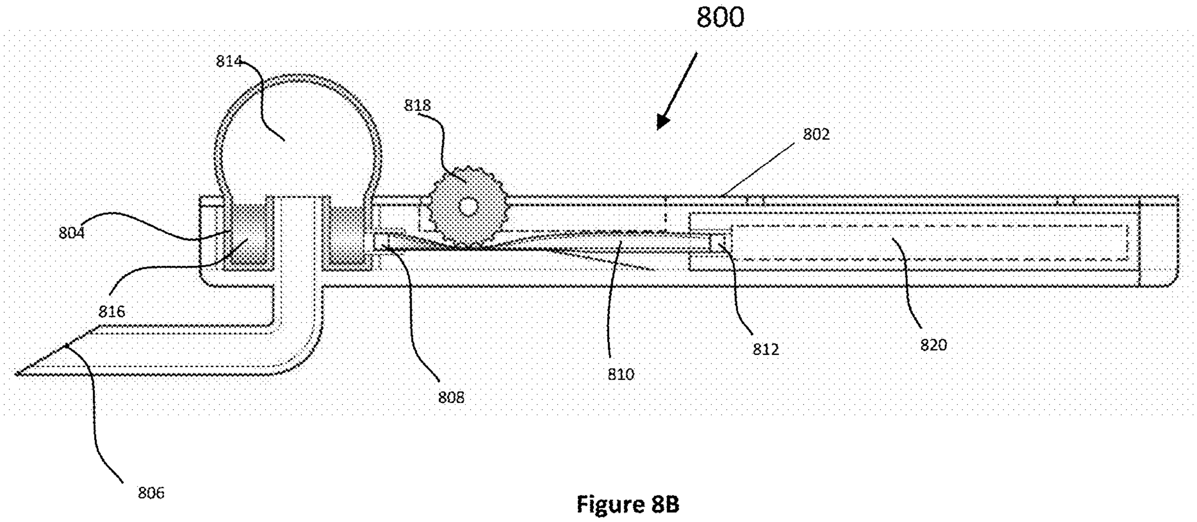
Figure 8C:
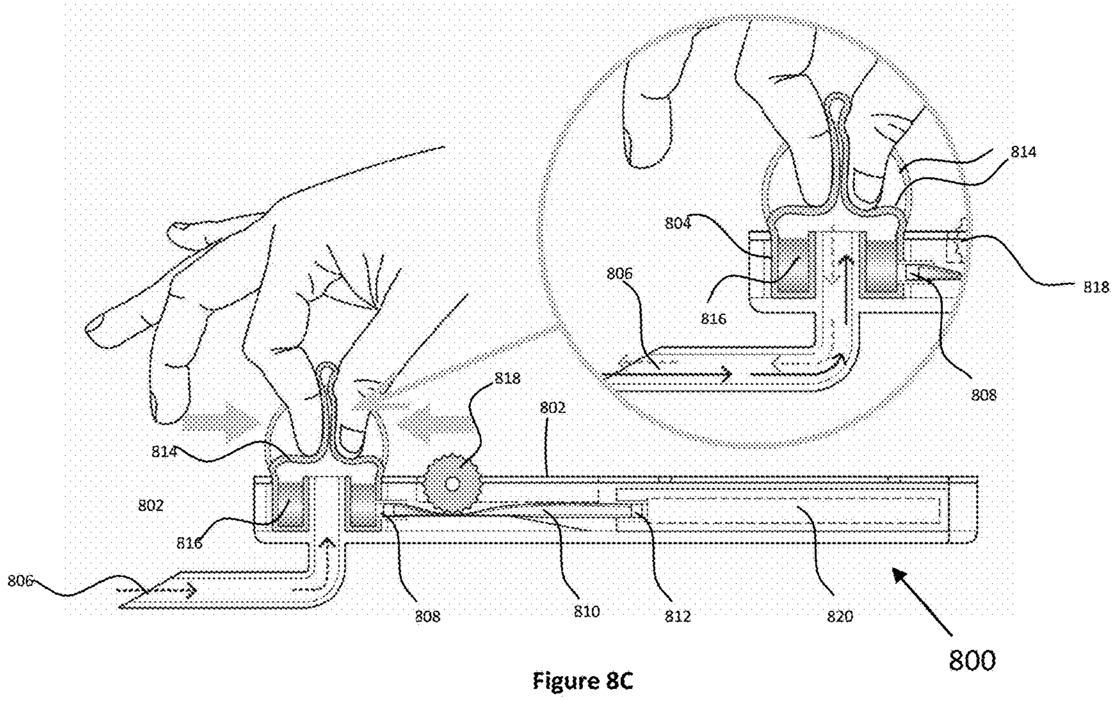
Figure 8D:
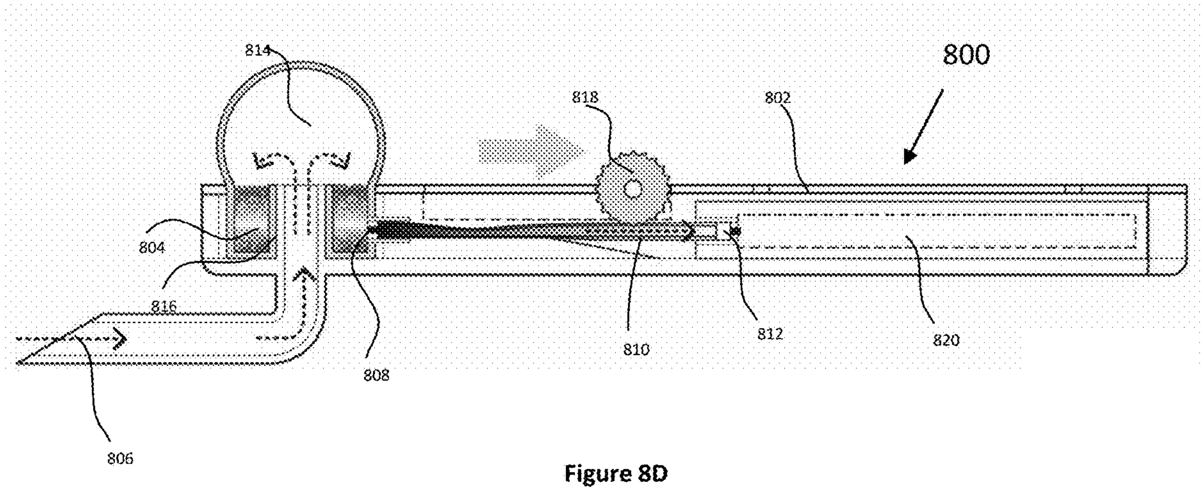
Figure 9A:
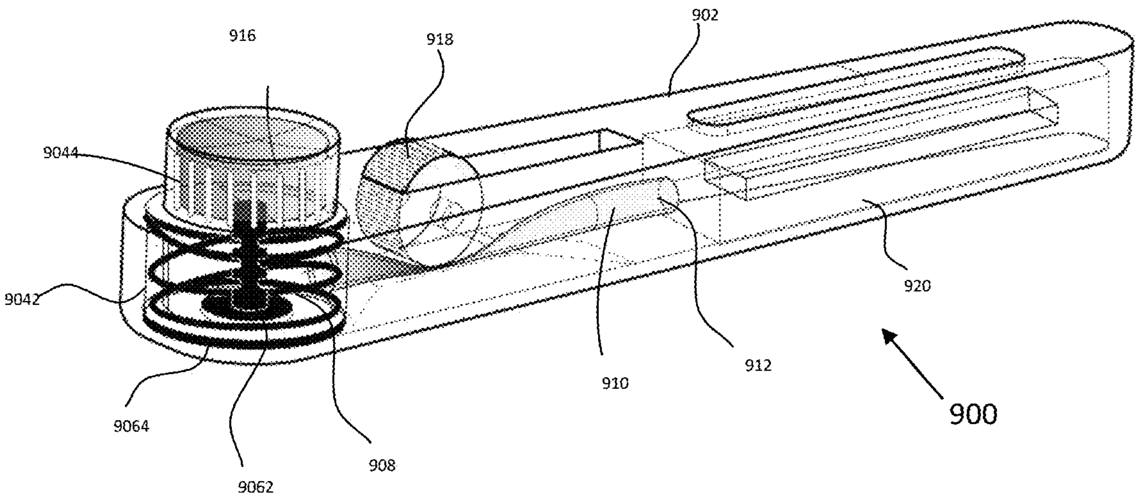
FIGS. 9A to 9D illustrate an eighth embodiment of an assembly for fluidic assaying in accordance with the teachings of the present invention.
Figure 9B:
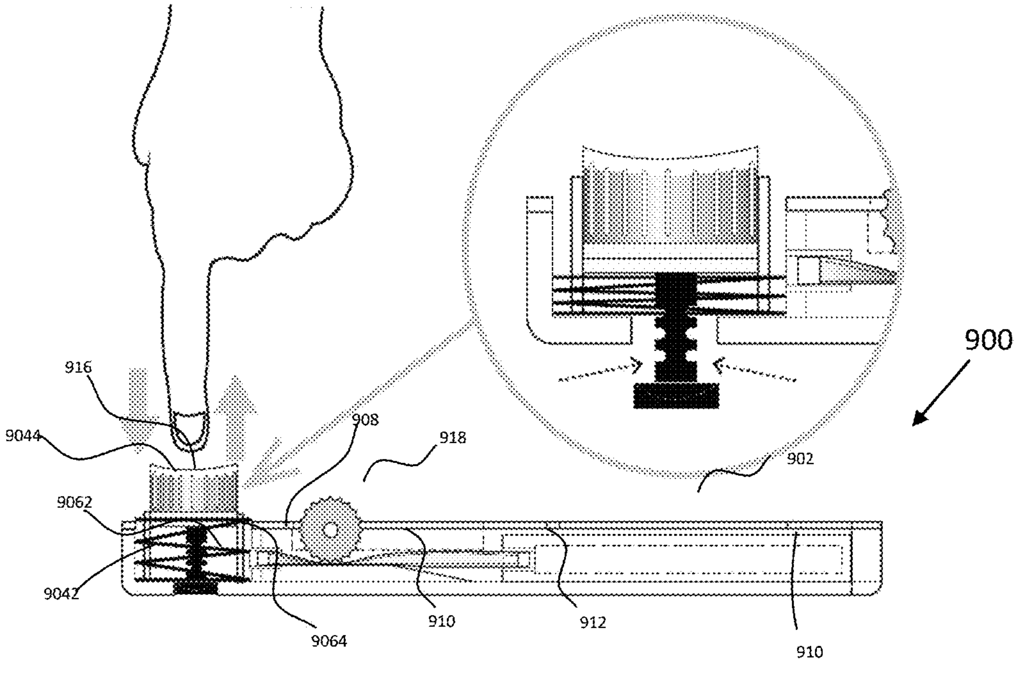
Figure 9C:
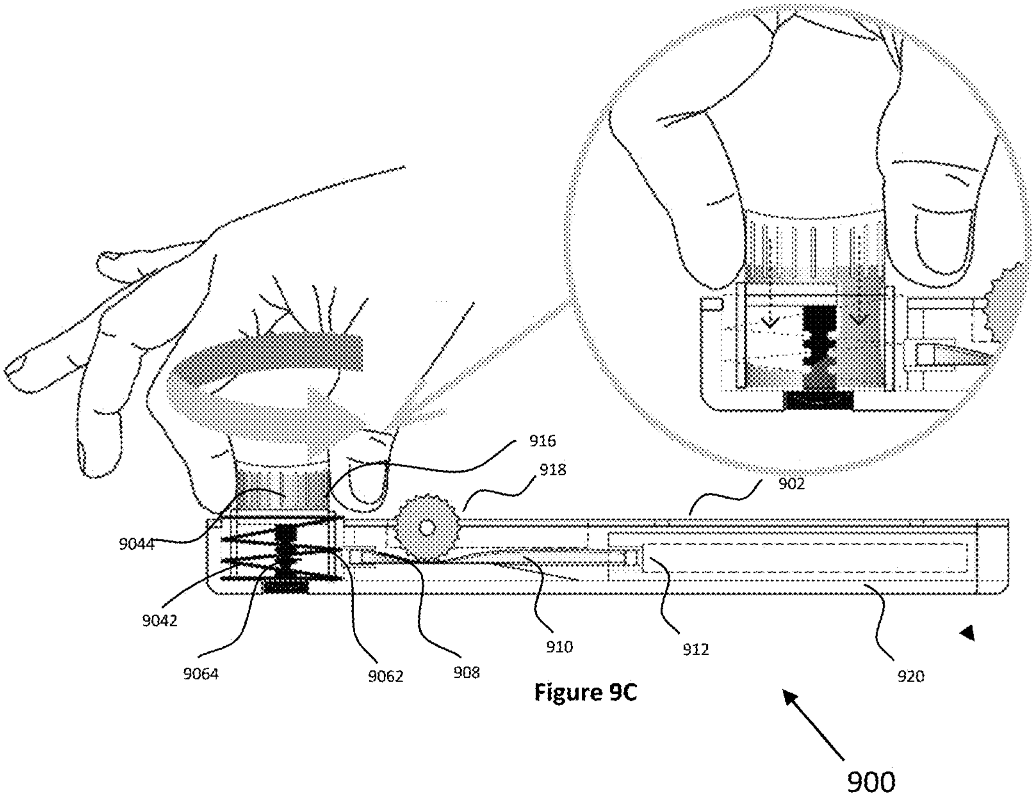
Figure 9D:
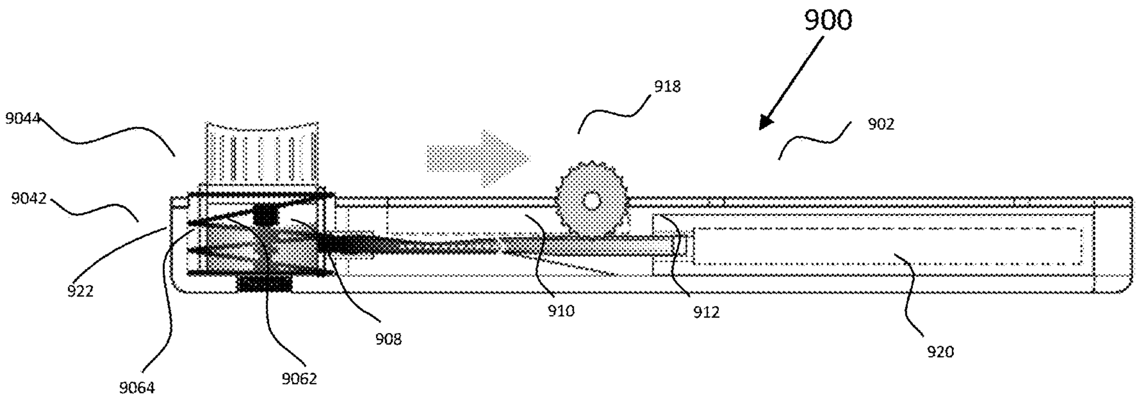

FIGS. 7A and 7B illustrate a sixth embodiment of an assembly for fluidic assaying in accordance with the teachings of the present invention.

The assembly 700 of FIGS. 7A and 7B comprises a pliant housing having a pliant inlet reservoir 702 having an open inlet end 7022 and an open outlet end 7024. Open outlet end 7024 is fluidly coupled through pliant fluid lumen 708 to pliant fluid chamber 704 through inlet opening 7042 in pliant fluid chamber 704. Pliant fluid chamber 704 also includes an outlet opening 7044 that fluidly couples fluid chamber 704 passageway 708 to assay assembly 706. In an embodiment, the pliant body of assembly 700 is configured to serve as a mixing component that enables generation of turbulence within one or more of the assay sample, the fluid intended for mixing with the assay sample, and the fluid-assay sample, for improving mixing of the fluid and assay sample. In operation, a portion of an assay sample is forced into pliant inlet reservoir 702 through open inlet end 7022, and is progressively forced (by application of squeezing forces or peristalsis like compressive forces around the pliant body of assembly 700) through open outlet end 7024 and fluid lumen 708 into fluid chamber 704—where it mixes with a fluid (for example a buffer, diluent, reagent or other liquid) stored within fluid chamber 704. As shown in FIG. 7B, mixing of the assay sample and fluid may be achieved by digitally agitating the pliant body of fluid chamber 704 (for example using a finger or hand)—whereafter, the fluid-assay sample mixture can be forced out of pliant fluid chamber 704 (for example by squeezing the pliant fluid chamber 704) through outlet opening 7044 and onto an assaying assembly 706. Preferably, the outlet opening 7044 may be located such that the fluid-assay sample mixture that is expelled from the outlet opening 7044 is delivered into a receptacle or chamber provided on the assaying assembly 706 for the purpose of receiving the fluid-assay sample mixture for the purpose of the fluidic assay.

FIGS. 8A to 8D illustrate a seventh embodiment of an assembly for fluidic assaying in accordance with the teachings of the present invention.

The assembly 800 of FIGS. 8A to 8D comprises a housing 802 having a fluid reservoir 804 having a reservoir inlet 806 and a reservoir outlet 808. Reservoir outlet 808 is fluidly coupled to pliant fluid lumen 810—which fluid lumen 810 is in turn fluidly coupled through lumen outlet 812 to assay assembly 820. Fluid reservoir 804 is prefilled with a fluid 816 (for example a buffer, diluent, reagent or other liquid) that is stored within the fluid reservoir 804. Fluid reservoir 804 is additionally provided with an inspiration actuator 814 (which may comprise a suction generating bulb or other suction or vacuum generating component) that is configured to generate a partial vacuum or a low-pressure region within fluid reservoir 804 upon actuation. In an embodiment where inspiration actuator 814 is a suction generating bulb, suction may be generated by a user or operator squeezing or compressing the bulb—which has the effect of expelling air from the bulb, which thereafter has the effect of generating suction as the bulb expands to regain its uncompressed state. Operation of assembly 800 is illustrated across FIGS. 8A to 8D. In operation, a portion of an assay sample is drawn into fluid reservoir 804 as a result of actuation of the inspiration actuator 814—whereupon, the portion of the assay sample mixes with the prefilled fluid 816 within the fluid reservoir 804. Thereafter, the fluid—assay sample mix is forced or expelled out of reservoir outlet 808, through pliant fluid lumen 810, out of lumen outlet 812 and onto assay assembly 820 by action of expulsion actuator 818. In the illustrated embodiment, expulsion actuator 818 is a wheel or slider that is configured apply pressure to pliant fluid lumen 810 and to be moved along the length of pliant fluid lumen 810—thereby progressively squeezing or urging the contents within pliant fluid lumen 810 in the direction of movement of expulsion actuator 818. It would be understood that the squeezing or compressive action of expulsion actuator 818 results in the fluid-assay sample mix from fluid reservoir 804 being progressively forced (by application of squeezing forces or peristalsis like compressive forces on pliant fluid lumen 810) from reservoir outlet 808, through pliant fluid lumen 810, out of lumen outlet 812 and onto assay assembly 820—whereafter the assay assembly provides a visual or other indicator of a result of the fluidic assay.

FIGS. 9A to 9D illustrate an eighth embodiment of an assembly for fluidic assaying in accordance with the teachings of the present invention.

The assembly 900 of FIGS. 9A to 9D comprises a housing 902 having a two-part fluid chamber comprising a first fluid reservoir 9044 and a second fluid mixing chamber 9042. In an initial state, first fluid reservoir 9044 is prefilled with a fluid 916 (for example a buffer, diluent, reagent or other liquid). First fluid reservoir 9044 may be provided with a selective release mechanism (for example a twist-release mechanism) that allows an operator to selectively switch between a first mode where fluid 916 is sealed within first fluid reservoir 9044 and a second mode where the fluid 916 that is stored within first fluid reservoir 9044 is permitted to flow into second fluid mixing chamber 9042 that is positioned directly below first fluid reservoir 9044. In an embodiment, the selective release mechanism is a twist release mechanism.

Second fluid mixing chamber 9042 is provided with a fluid outlet 908. Fluid outlet 908 is fluidly coupled to pliant fluid lumen 910—which fluid lumen 910 is in turn fluidly coupled through lumen outlet 912 to assay assembly 920.

Incorporated into second fluid mixing chamber 9042 is a retractable probe 9062 that can be selectively extended out of second fluid mixing chamber 9042 so that it comes in contact with and permits adherence of an assay sample thereon, whereafter said retractable probe 9062 is withdrawn back into second fluid mixing chamber 9042—causing such portion of the assay sample that has adhered to the retractable probe 9062 to be withdrawn into second fluid mixing chamber 9042. In an embodiment the actuation mechanism for retractable probe 9062 comprises a combination of an actuation button coupled to retractable probe 9062, which actuation button responds to operator induced pressure by moving from a rest position to an actuation position, and in which actuation position, said actuation button forces retractable probe 9062 out of second fluid mixing chamber 9042 and into the assay sample, and a spring mechanism that urges the actuation button back into a rest state upon cessation of the operator induced pressure thereon. In resuming its rest position, actuation button causes interconnected retractable probe 9062 to be drawn back into second fluid mixing chamber 9042—along with a portion of the assay sample that has adhered to retractable probe 9062.

Once retractable probe 9062 is withdrawn into second fluid mixing chamber 9042, a release mechanism coupled to first fluid reservoir 9044 may be manipulated to switch from a first mode where fluid 916 is sealed within first fluid reservoir 9044 to a second mode where the fluid 916 that is stored within first fluid reservoir 9044 is permitted to flow into second fluid mixing chamber 9042 that is positioned directly below first fluid reservoir 9044. As a result of the fluid 916 flowing into second fluid mixing chamber 9042, said fluid comes into contact with and mixes with such portion of the assay sample that has been drawn by retractable probe 9062 into second fluid mixing chamber 9042.

Once the assay sample and fluid have been mixed within second fluid mixing chamber 9042, the resulting fluid-assay sample mixture is expelled out of second fluid mixing chamber 9042, through pliant fluid lumen 910, out of lumen outlet 912 and onto assay assembly 920 by action of expulsion actuator 918. In the illustrated embodiment, expulsion actuator 918 is a wheel or slider that is configured apply pressure to pliant fluid lumen 910 and to be moved along the length of pliant fluid lumen 910—thereby progressively squeezing or urging the contents within pliant fluid lumen 910 in the direction of movement of expulsion actuator 918. It would be understood that the squeezing or compressive action of expulsion actuator 918 results in the fluid-assay sample mixture from second fluid mixing chamber 9042 being progressively forced (by application of squeezing forces or peristalsis like compressive forces on pliant fluid lumen 910) from fluid outlet 908, through pliant fluid lumen 910, out of lumen outlet 912 and onto assay assembly 920—whereafter the assay assembly provides a visual or other indicator of a result of the fluidic assay.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclosed herein suitably may be practiced in the absence of any element which is not specifically disclosed herein—and in a particular embodiment that is specifically contemplated, the invention is intended to be practiced in the absence of any one or more elements which are not specifically disclosed herein.

We claim:

1. A fluidic assay assembly comprising:

a housing comprising:

an inlet opening, an outlet opening, and at least one fluid chamber formed within the housing, wherein the fluid chamber is configured to hold a fluid intended for mixing with an assay sample;

an assaying assembly comprising a receptacle for receiving a fluid-assay sample mixture, the receptacle of the assaying assembly is in fluid communication with the outlet opening;

an inspiration actuator configured to draw the assay sample from the inlet opening into a region of the housing where the assay sample contacts the fluid from the fluid chamber to form the fluid-assay sample mixture;

an expulsion actuator configured to expel the fluid-assay sample mixture through the outlet opening to the receptacle of the assaying assembly;

a plunger disposed within the housing, and wherein said plunger is within one or both of the inspiration actuator and the expulsion actuator, wherein the plunger is configured such that:

movement of the plunger in a first direction implements an inspiration stroke for drawing the assay sample from the inlet opening into the region of the housing where the assay sample contacts the fluid from the fluid chamber; and continued movement of the plunger in the first direction implements an expulsion stroke for expelling the fluid-assay sample mixture through the outlet opening to the receptacle of the assaying assembly.

2. The fluidic assay assembly as claimed in claim 1, wherein:

the inlet opening has a one-way valve disposed thereon, wherein the one-way valve is configured to restrict expulsion of fluid or matter from the housing through the inlet opening; or the outlet opening has a one-way valve disposed thereon, wherein the one-way valve is configured to restrict fluid or matter from entering the housing through the outlet opening.

3. The fluidic assay assembly as claimed in claim 1, wherein the fluid is any one of a buffer, diluent, reagent or other similar fluid.

4. The fluidic assay assembly as claimed in claim 1, wherein the assaying assembly is configured to provide a visual indicator in response to being contacted by one or more target analytes within the fluid-assay sample mixture.

5. The fluidic assay assembly as claimed in claim 1, wherein the assaying assembly includes any one or more of an assay substrate, assay membrane, assay pad, assay chamber or assay well.

6. The fluidic assay assembly as claimed in claim 1, wherein the plunger is a reciprocable plunger configured such that:

movement of the plunger in a first direction implements an inspiration stroke for drawing the assay sample from the inlet opening into the region of the housing where the assay sample contacts the fluid from the fluid chamber; and movement of the plunger in a second direction opposite to the first direction implements an expulsion stroke for expelling the fluid-assay sample mixture through the outlet opening to the receptacle of the assaying assembly.

7. The fluidic assay assembly as claimed in claim 6, wherein said housing includes a resilient member configured to urge the plunger in one of the first direction and the second direction.

8. The fluidic assay assembly as claimed in claim 1, wherein:

the region of the housing where the assay sample contacts the fluid from the fluid chamber, partially or wholly coincides with the fluid chamber.

9. A fluidic assay assembly comprising:

a housing comprising:

an inlet opening, an outlet opening, and at least one fluid chamber formed within the housing, wherein the fluid chamber is configured to hold a fluid intended for mixing with an assay sample;

an assaying assembly comprising a receptacle for receiving a fluid-assay sample mixture, the receptacle of the assaying assembly is in fluid communication with the outlet opening:

an inspiration actuator configured to draw the assay sample from the inlet opening into a region of the housing where the assay sample contacts the fluid from the fluid chamber to form the fluid-assay sample mixture; and an expulsion actuator configured to expel the fluid-assay sample mixture through the outlet opening to the receptacle of the assaying assembly;

a plunger disposed within the housing; and at least one mixing component that comprises one or more channels formed on one or more inner walls of the housing, wherein the at least one mixing component is configured to generate turbulence within one or more of the assay sample, the fluid intended for mixing with the assay sample, and the fluid-assay sample, for accelerated and homogeneous mixing of the fluid and assay sample.

10. The fluidic assay assembly as claimed in claim 9, wherein the at least one mixing component comprises one or more channels or grooves formed within or on a plunger head.

11. The fluidic assay assembly as claimed in claim 9, wherein: the at least one mixing component comprises a part of the housing having pliant characteristics.

* * * * *